(12) United States Patent
Kikkoji et al.

(10) Patent No.: US 8,006,309 B2
(45) Date of Patent: Aug. 23, 2011

(54) INFORMATION PROCESSING DEVICE AND COMMUNICATION METHOD

(75) Inventors: Hiroyuki Kikkoji, Tokyo (JP); Nozomu Okuzawa, Tokyo (JP); Jun Moriya, Tokyo (JP); Yasuhiro Murase, Tokyo (JP)

(73) Assignee: Sony Corporation, Tokyo (JP)

( * ) Notice: Subject to any disclaimer, the term of this patent is extended or adjusted under 35 U.S.C. 154(b) by 617 days.

(21) Appl. No.: 10/567,689

(22) PCT Filed: May 18, 2004

(86) PCT No.: PCT/JP2004/007017
§ 371 (c)(1),
(2), (4) Date: Feb. 9, 2006

(87) PCT Pub. No.: WO2005/015420
PCT Pub. Date: Feb. 17, 2005

(65) Prior Publication Data
US 2006/0274757 A1 Dec. 7, 2006

(30) Foreign Application Priority Data

Aug. 11, 2003 (JP) ................................ 2003-291741
Sep. 30, 2003 (JP) ................................ 2003-339498

(51) Int. Cl.
*G06F 7/04* (2006.01)
*G06F 17/30* (2006.01)
*H04L 9/32* (2006.01)
*H04L 29/06* (2006.01)

(52) U.S. Cl. ............ 726/27; 726/30; 713/168; 713/170; 713/155

(58) Field of Classification Search ............... 705/51, 705/52, 57, 59, 64, 67; 713/168, 155, 160–161, 713/170; 709/227, 217, 219, 228; 455/411, 455/410, 406; 726/1–36; 370/252–255, 370/278, 316, 395.2
See application file for complete search history.

(56) References Cited

U.S. PATENT DOCUMENTS
6,128,661 A * 10/2000 Flanagin et al. .............. 709/227
(Continued)

FOREIGN PATENT DOCUMENTS
JP         2002-116977          4/2002
(Continued)

OTHER PUBLICATIONS

U.S. Appl. No. 10/526,902, filed Aug. 16, 2005, Yamashita et al.
(Continued)

*Primary Examiner* — Eleni A Shiferaw
*Assistant Examiner* — Phy Anh Vu
(74) *Attorney, Agent, or Firm* — Oblon, Spivak, McClelland, Maier & Neustadt, L.L.P.

(57) ABSTRACT

An interface receives, in a ticket request, service ID data designating a service to be provided, together with user ID data and apparatus ID data, from an external apparatus, and receives a cancellation request including the user ID data and the apparatus ID data from the external apparatus. A processor produces a result of an authentication based on the user ID data and the apparatus ID data upon a reception of the ticket request, and deletes, from a memory, the apparatus ID data after deleting, from the memory, the service ID data, when the interface receives, from the external apparatus, the cancellation request requesting a deletion of the apparatus ID data. The interface transmits a ticket to the external apparatus, in response to the reception of the ticket request, based on the result of the authentication based on the user ID data and the apparatus ID data.

10 Claims, 22 Drawing Sheets

U.S. PATENT DOCUMENTS

| | | | |
|---|---|---|---|
| 6,510,236 B1 * | 1/2003 | Crane et al. | 382/116 |
| 2001/0056404 A1 * | 12/2001 | Kuriya et al. | 705/51 |
| 2002/0157104 A1 * | 10/2002 | Nakada et al. | 725/97 |
| 2002/0194474 A1 * | 12/2002 | Natsuno et al. | 713/168 |
| 2003/0078723 A1 * | 4/2003 | Kunigita | 701/208 |
| 2003/0134615 A1 * | 7/2003 | Takeuchi | 455/411 |
| 2005/0060701 A1 | 3/2005 | Murase | |
| 2005/0091679 A1 | 4/2005 | Tanaka et al. | |

FOREIGN PATENT DOCUMENTS

| | | |
|---|---|---|
| JP | 2003-167900 | 6/2003 |
| JP | 2003-173381 | 6/2003 |
| JP | 2003-196563 | 7/2003 |
| WO | WO 03028283 A1 * | 4/2003 |

OTHER PUBLICATIONS

U.S. Appl. No. 10/554,542, filed Oct. 25, 2005, Iwatsu et al.
U.S. Appl. No. 10/564,317, filed Jan. 12, 2006, Kikkoji et al.
U.S. Appl. No. 10/557,207, filed Nov. 17, 2005, Kikkoji et al.
U.S. Appl. No. 10/555,654, filed Nov. 4, 2005, Kikkoji et al.
U.S. Appl. No. 10/556,944, filed Nov. 16, 2005, Kikkoji et al.
U.S. Appl. No. 10/563,258, filed Jan. 4, 2006, Iwatsu et al.
U.S. Appl. No. 10/557,141, filed Nov. 17, 2005 Murase et al.
U.S. Appl. No. 10/556,728, filed Nov. 14, 2005, Iwatsu et al.
U.S. Appl. No. 10/563,315, filed Jan. 4, 2006, Iwatsu et al.
U.S. Appl. No. 10/557,193, filed Nov. 17, 2005, Kikkoji et al.
U.S. Appl. No. 10/566,630, filed Jan. 31, 2006, Sakoh et al.
U.S. Appl. No. 10/561,187, filed Dec. 16, 2005, Araki et al.
U.S. Appl. No. 10/565,965, filed Jan. 26, 2006, Iwatsu.
U.S. Appl. No. 10/564,058, filed Jan. 10, 2006, Kikkoji et al.
U.S. Appl. No. 10/556,893, field Nov. 15, 2005, Sakoh et al.
U.S. Appl. No. 10/557,040, filed Nov. 16, 2005, Kikkoji et al.
U.S. Appl. No. 10/556,729, filed Nov. 14, 2005, Kikkoji et al.
U.S. Appl. No. 10/555,990, filed Nov. 8, 2005, Murase et al.
U.S. Appl. No. 10/560,229, filed Dec. 12, 2005, Kikkoji et al.
U.S. Appl. No. 10/564,062, filed Jan. 10, 2006, Kikkoji et al.
U.S. Appl. No. 10/567,033, filed Feb. 3, 2006, Sakoh et al.
U.S. Appl. No. 10/572,743, filed Mar. 21, 2006, Kikkoji et al.
U.S. Appl. No. 10/564,414, filed Jan. 12, 2006, Sakoh et al.
U.S. Appl. No. 10/571,540, filed Mar. 10, 2006, Sakoh et al.
U.S. Appl. No. 10/567,776, filed Feb. 9, 2006, Iwatsu et al.
U.S. Appl. No. 10/568,968, filed Feb. 22, 2006, Okuzawa.
U.S. Appl. No. 10/569,227, filed Feb. 23, 2006, Yasuda.
U.S. Appl. No. 10/573,580, filed Mar. 24, 2006, Sakoh et al.
U.S. Appl. No. 10/573,418, filed Mar. 27, 2006, Iwatsu et al.
U.S. Appl. No. 10/571,458, filed Mar. 13, 2006, Iwatsu et al.
U.S. Appl. No. 10/571,774, filed Mar. 15, 2006, Sakoh et al.
U.S. Appl. No. 10/573,647, filed Mar. 28, 2006, Kikkoji et al.
Office Action issued Aug. 19, 2010, in Japan Patent Application No. 2005-512896.

* cited by examiner

INFORMATION PROCESSING DEVICE AND COMMUNICATION METHOD

TECHNICAL FIELD

The present invention relates to an information-processing apparatus, an information-processing system, a communication method for use in an information-processing apparatus, and communication program for use in an information-processing apparatus. More particularly, the invention relates to an information-processing apparatus and an information-processing system, in which information stored is deleted in response to a user's request for canceling service, and also to a communication method for use in such an information-processing apparatus, and a communication program for use in such an information-processing apparatus.

BACKGROUND ART

Various kinds of service, which are related to music, are offered on the Internet at present. Among these are the service of distributing the information, audio data and the like about the musical pieces stored in CDs (Compact Discs). Another kind of service is to provide the music-related information (NowOn-Air) representing the titles of the musical pieces being broadcast in radio programs, the names of the artists who play the musical pieces, the names or number of the CD storing the musical pieces. Two other kinds of service are to distribute digital data representing musical pieces and to accept orders for CDs for sales.

There is an information-processing apparatus (e.g., server) that can offer various kinds of service to the user. The user can receive these kinds of service if he or she is registered in the information-processing apparatus. When the user is registered, apparatus ID data is stored in the information-processing apparatus. The apparatus ID data identifies the apparatus that the user must use to access the information-processing apparatus.

The information-processing apparatus gives service in accordance with service ID data that identifies the service the user wants to receive. The service ID data is stored in association with the user ID data and the apparatus ID data. The information-processing apparatus authenticates the user who has accessed it, in accordance with the user ID data and the apparatus ID data.

The apparatus that the user uses to receive the service incorporates a nonvolatile storage device such as a hard disk drive. The nonvolatile storage device stores the apparatus ID data that must be used to access the information-processing apparatus.

Assume that the service of the information-processing apparatus is canceled. Also assume that the user gives or sells his apparatus to any other person. In either case, the information must be deleted from the information-processing apparatus and the user's apparatus. If the information were not deleted, it would be disclosed.

A personal authentication system is known. In this system, a portable terminal receives the ID data of its user, and the authentication unit authenticates the user in accordance with the ID data input to the portable terminal and the personal authentication information stored in a portable authentication medium. Thus, the personal authentication function is physically isolated from the user interface that inputs the user ID data. The user can be identified even if the portable authentication medium remains in the user's wallet or bag. The personal authentication system can therefore enhance security and operationality. (See, for example, Patent Document 1).

Patent Document 1: Jpn. Pat. Appln. Laid-Open Publication No. 2003-85498 (paragraphs [0059] to [0092] and FIG. 1.)

However, the user cannot access the information-processing apparatus if the apparatus ID data is deleted prior to the deletion of the service ID data. Consequently, the service ID data can no longer be deleted.

DISCLOSURE OF THE INVENTION

This invention has been made in view of the foregoing. An object of the invention is to provide an information-processing apparatus and an information-processing system, in which service ID data can be reliably deleted, and to provide a communication method for use in such an information-processing apparatus, and a communication program for use in such an information-processing apparatus.

To achieve the object, the present invention provides an information-processing apparatus configured to delete information stored, in accordance with a request made by a user for canceling service. The apparatus is characterized by comprising: a receiving means for receiving service identification data designating specific service to be provided, together with user identification data from an external apparatus and apparatus ID data that identifies the external apparatus; a storage means for storing the user ID data, apparatus ID data and service ID data, as being related to each other; a deleting means for deleting the apparatus ID data after deleting the service ID data, when the receiving means receives data requesting for deletion of the apparatus ID data, together with the user ID data and apparatus ID data; and a transmitting means for transmitting, to the external apparatus, deletion-complete information indicating that the deleting means has finished deleting the apparatus ID data.

In this information-processing apparatus, the apparatus ID data is deleted after deleting the service ID data, when the receiving means receives data requesting for deletion of the apparatus ID data that identifies the external apparatus.

In the information-processing apparatus according to this invention, the service ID data is deleted before the apparatus ID data is deleted, which is the information required for the access to an apparatus. Therefore, the service ID data can be reliably deleted.

BEST MODE FOR CARRYING OUT THE INVENTION

(1) Fundamental Concept of the Invention

The concept of the present invention will be described in detail, with reference to the accompanying drawings.

Figure 1:
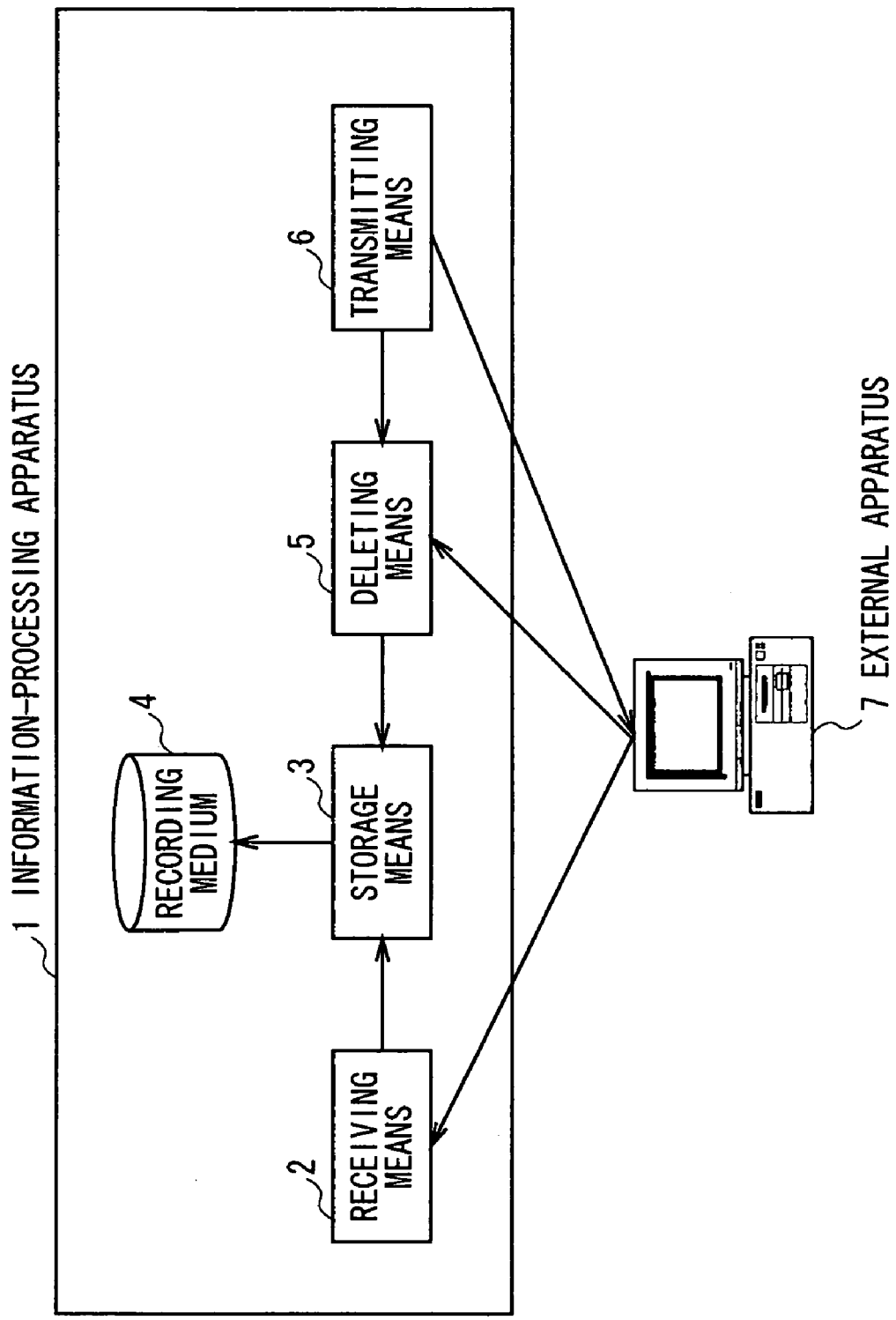
FIG. 1 is a diagram representing the fundamental concept of the present invention.

FIG. 1 is a diagram representing the concept of the invention. As FIG. 1 shows, an information-processing apparatus 1 has a receiving means 2, a storage means 3, a recording medium 4, a deleting means 5, and a transmitting means 6. The information-processing apparatus 1 is connected to an external apparatus 7. The apparatus 1 can therefore perform data communication with the external apparatus 7.

Although not shown in FIG. 1, the in4formation-processing apparatus 1 is connected to a plurality of servers that provide various kinds of service. Each server provides service to the person who has been registered as user of the external apparatus 7. The user can receive the various kinds of service from the external apparatus 7 after the registration in the information-processing apparatus 1.

When the user is registered, he or she acquires user ID data that identifies him or her. The user stores apparatus ID data in the external apparatus 7. The apparatus ID data, which identifies the external apparatus 7, is a code that the user can arbitrarily make. The user may have two or more external apparatuses. In this case, the information-processing apparatus 1 distinguishes one external apparatus that the user can use from another, in accordance with the apparatus ID data. The external apparatus 7 can access the information-processing apparatus 1 by using the user ID data and the apparatus ID data.

In the information-processing apparatus 1, the receiving means 2 receives service ID data from the external apparatus 7, along with the user ID data and the apparatus ID data. The service ID data identifies a specific kind of service that the user wants. As indicated above, the user ID data identifies the user, and the apparatus ID data identifies the external apparatus 7.

The storage means 3 stores the user ID data, apparatus ID data and service ID data in the recording medium 4, each data associated in any other.

The deleting means 5 deletes the service ID data and then the apparatus ID data when the receiving means 2 receives a request for deleting the apparatus ID data, together with the user ID data and the apparatus ID data.

When the deleting means 5 deletes the service ID data and the apparatus ID data, the transmitting means 6 transmits completion data to the external apparatus 7. The completion data indicates that the service ID data and the apparatus ID data have been deleted.

The operation of each component shown in FIG. 1, which represents the concept of the invention, will be explained. In the information-processing apparatus 1, the receiving means 2 receives the user ID data, apparatus ID data and service ID data that the user has registered in the external apparatus 7.

The storage means 3 stores the user ID data, apparatus ID data and service ID data, all received by the receiving means 2, in the recording medium 4.

Using the user ID data, apparatus ID data and service ID data, the external apparatus 7 accesses the information-processing apparatus 1 and can request for service. On the basis of the service ID data, the information-processing apparatus 1 enables the user to receive the service from the server that actually provides the service.

Assume that the user cancels the service. When the receiving means 2 receives a request for deleting the apparatus ID data, along with the user ID data and the apparatus ID data, the deleting means 5 of the information-processing apparatus 1 deletes the service ID data and then the apparatus ID data.

The transmitting means 6 transmits completion data to the external apparatus 7, informing the apparatus 7 that the deleting means 5 has completed the deletion.

Thus, the information-processing apparatus 1 deletes first the service ID data and then the apparatus ID data, upon receiving the request for deleting the apparatus ID data from the external apparatus 7. Therefore, the external apparatus 7 can no longer access the information-processing apparatus 1. This prevents the failure of deleting the service ID data. In other words, the service ID data can be reliably deleted.

(2) First Embodiment

The first embodiment of this invention will be described in detail, with reference to the drawings. In the following description, the process of saving the information about musical pieces or a set of musical pieces will be referred to as "clip."

Figure 2:
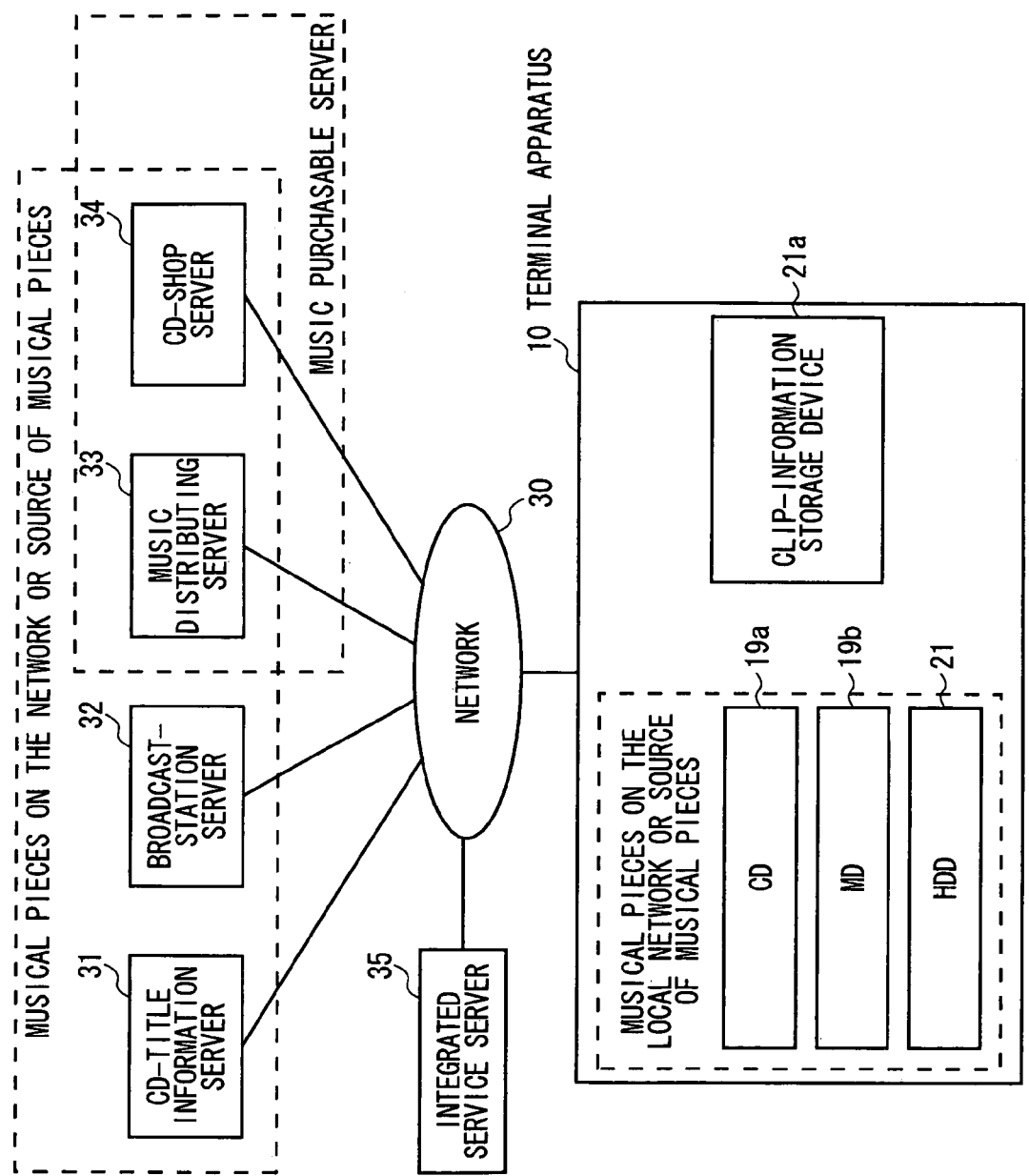
FIG. 2 is a block diagram of a network system according to a first embodiment of the invention.

FIG. 2 is a diagram depicting a network system relating to the first embodiment. The terminal apparatus 10 is connected to various servers through the network 30. The network 30 is, for example, the Internet. The servers are a CD-title information server 31, a broadcast-station server 32, a music distributing server 33, a CD-shop server 34, an integrated service server 35, and the like.

The CD-title information server 31 distributes the information about the musical pieces recorded in CDs that are commercially available.

The broadcast-station server 32 is a server that is managed by a broadcast station that broadcasts FM programs and TV programs. The server 32 performs the service of providing the information related to musical pieces to be broadcast.

The broadcast-station server 32 provides the related information in, broadly speaking, two modes. The first mode is "NowOn-Air," in which the server 32 provides the information about the program being broadcast at present. In the second mode, the server 32 provides the information about the musical pieces already broadcast (on-air list) at the request of the terminal apparatus 10. (The on-air list contains information about each musical piece that has been broadcast). The broadcast-station server 32 provides information about musical pieces broadcast on a specified program and information about musical pieces broadcast in a specified period.

The music distributing server 33 distributes digital data representing musical pieces (music data items). It provides the music data to the terminal apparatus 10 only if the user has taken procedures to buy the musical pieces. The server 33 can provide the information about the musical pieces that are to be distributed.

The CD-shop server 34 receives the order the user makes to buy CDs. The server 34 can distribute promotion audio data and provide the information about the musical pieces recorded in the CDs that the CD shops sell.

The integrated service server 35 functions as a portal site where services are given via the network 30. In other words, the server 35 conveys services. For example, the server 35 distributes the information representing the sources of the musical pieces being broadcast, to the terminal apparatus 10. This information is, for example, URL (Uniform Resource Locator).

Thus, a plurality of servers perform the service of providing the information about musical pieces or a set of musical pieces that can be distributed on the network 30. That is, each server works as a source of the musical piece or a set of musical pieces on the network 30.

The music distributing server 33 and the CD-shop server 34 are servers from which musical pieces can be bought. If the user may operate the terminal apparatus 10, accessing the music distributing server 33 or the CD-shop server 34, he or she can buy musical pieces or a set of musical pieces through the network 30. The user of the terminal apparatus 10 may take procedures to the music distributing server 33 in order to buy musical pieces. In this case, the music data can be downloaded from the server 33. The user may also take procedures to the CD-shop server 34 in order to buy musical pieces. Then, the user can have the CD delivered to his or her home.

The terminal apparatus 10 has three recording media, i.e., a CD 29a, an MD (Mini Disc) 29b and a hard disk drive (HDD) 21. These recording media hold musical pieces or a set of musical pieces, which are distributed by a local source. The CD 29a and the MD 29b are portable recording media and can easily be removed from the terminal apparatus 10. The type of the local source prepared for the terminal apparatus 10 depends on the type and use of the terminal apparatus 10.

The musical pieces or the set of musical sources, which are shown in FIG. 2, is nothing more than an example. Whichever media can function as a local source of musical pieces or a set of musical pieces, by recording musical pieces or a set of musical pieces, only if they are incorporated in the terminal apparatus 10.

The terminal apparatus 10 has a clip-information storage device 21a. The device 21a can store any related information that has been clipped. The clip-information storage device 21a is the secondary storage device to the terminal apparatus 10. It may be a part of the storage region of, for example, the HDD 21. The terminal apparatus 10 can clip not only musical pieces, but also a set of musical pieces. Thus, the terminal apparatus 10 can clip an FM program or CD album that contains many musical pieces interesting to the user, through a single clipping operation.

The terminal apparatus 10 can work as an audio apparatus, as well, which can playback musical pieces.

Figure 3:
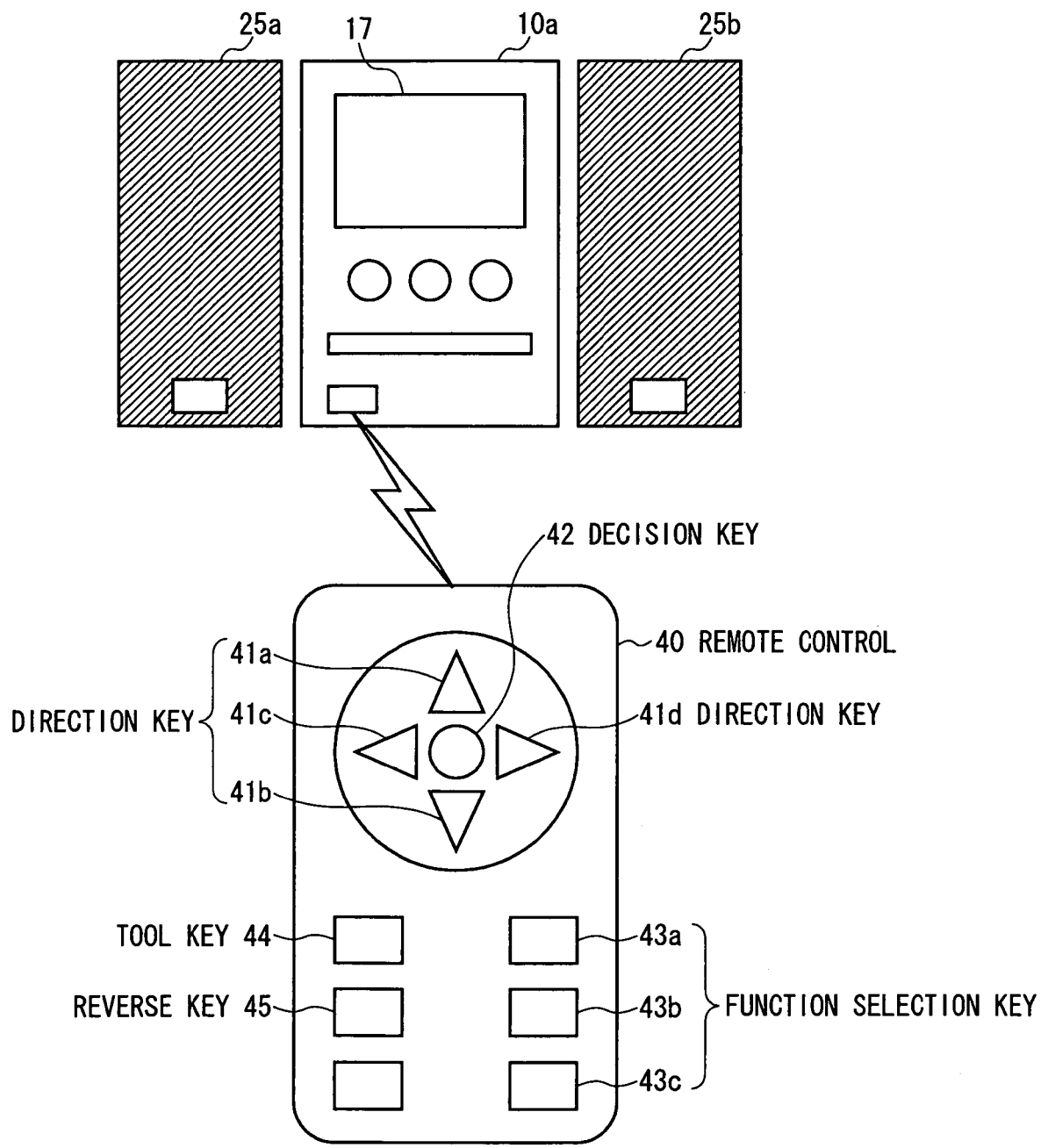
FIG. 3 is a diagram illustrating the outer appearance of a terminal apparatus.

FIG. 3 is a diagram illustrating the outer appearance of a terminal apparatus 10. As FIG. 3 shows, the terminal apparatus 10 according to this embodiment looks like an audio system of the ordinary type. The terminal apparatus 10 has a main unit 10a, speakers 25a and 25b, and a remote controller 40. The main unit 10a can perform the function of playing back CDs and DVDs (Digital Versatile Discs), the function of recording data on and reproducing data from MDs, and the function of receiving FM programs and TV programs. The main unit 10a generates audio signals, which are supplied to the speakers 25a and 25b. The speakers 25a and 25b generate sound from the audio signals.

The main unit 10a incorporates a display device 17. The display device 17 can display the information about the musical piece being played back or the related information clipped and stored.

The remote controller 40 is an input device for operating the main unit 10a by remote control. The remote controller 40 has a plurality of operation keys. When the user depresses the operation keys, the remote controller 40 transmits signals to the main unit 10a by radio, for example, by means of infrared-ray transmission.

Among the operation keys are directions keys 41a to 41d, a set key 4, function-selecting keys 43a to 43c, a tool key 44 and a return key 45.

The direction keys 41a to 41d are used to move the cursor on the screen of the display device 17 and to move a position where focusing should be achieved. The four direction keys 41a to 41d designate the upward, downward, leftward and rightward directions, respectively. When the keys 41a to 41d are depressed, the cursor or the like moves on the screen of the display device 17, in the directions that the keys 41a to 41d designate.

The set key 42 sets the information the display device 17 is displaying.

The function-selecting keys 43a to 43c are used to select functions. The three function-selecting keys 43a to 43c are allocated to the integrated-service use function, the tuner function and the local-content managing function, respectively. When any one of the function-selecting keys 43a to 43c is depressed, the main unit 10a is set to the operating mode associated with the function-selecting key depressed.

The tool key 44 is a button, which is pushed to cause the display device 17 to display a tool menu. The tool menu includes commands related to the contents displayed on the display device 17, too. The user can select any command displayed from the tool menu, to make the terminal apparatus 10 perform the process designated by the command. Assume that the user selects a command by operating the direction keys 41a to 41d and then depresses the set key 42. Then, the terminal apparatus 10 carries out the process that the selected command designates.

The return key 45 is a button, which is pushed to change the information displayed on the display device 17, back to the information previously displayed.

Figure 4:
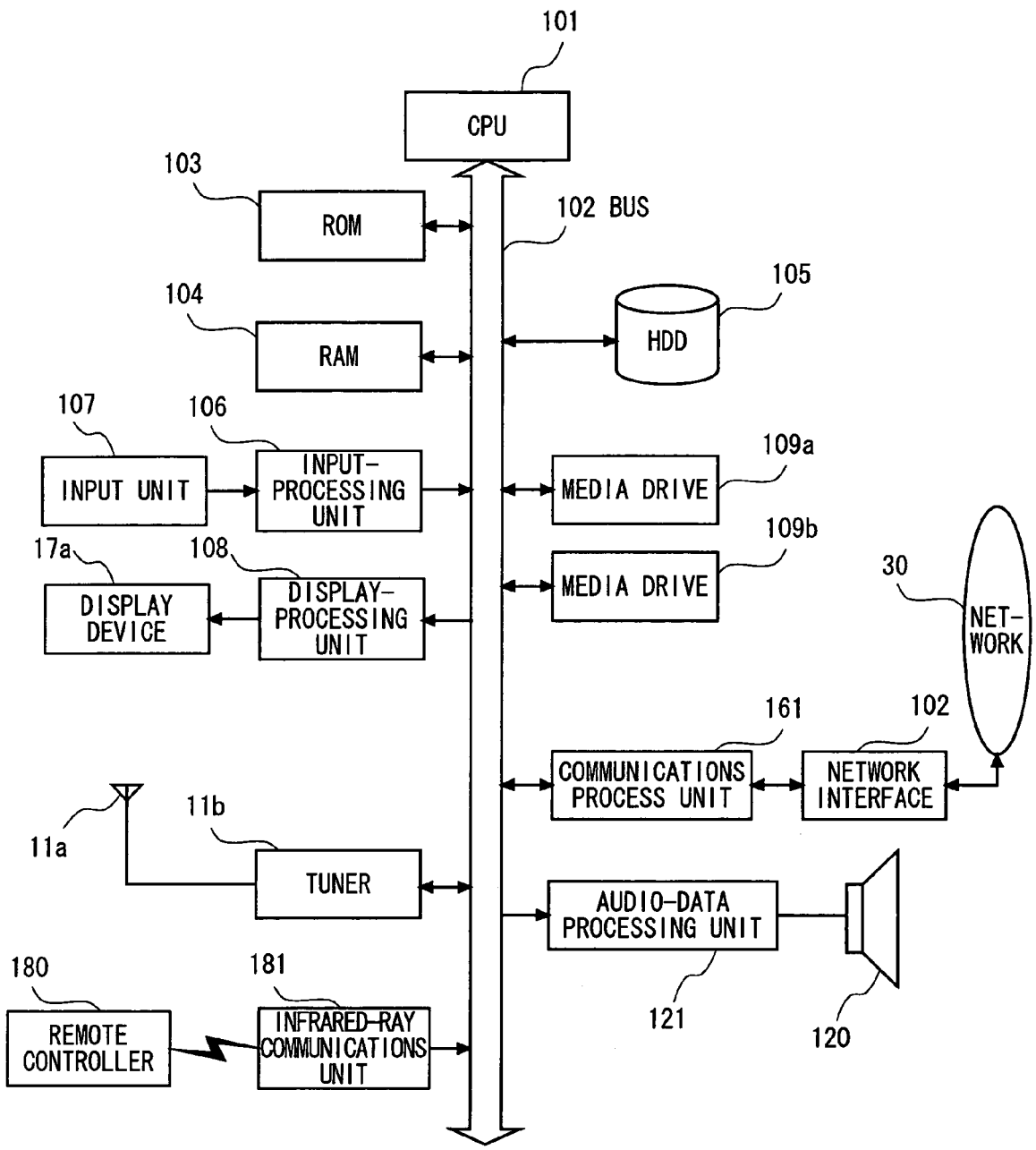
FIG. 4 is a block diagram illustrating the hardware configuration of the terminal apparatus.

The remote controller 40 can have other keys, in addition to those illustrated in FIG. 4. For example, a volume control key, a playback key, a stop key, and the like.

The internal structure of the terminal apparatus 10 will be described.

FIG. 4 is a block diagram showing the hardware configuration of the terminal apparatus 10. So configured as depicted in FIG. 4, the terminal apparatus 10 can manage, record and reproduce various sources, such as musical pieces.

The CPU 101 controls the entire terminal apparatus 10 and performs various operations, in accordance with the program activated. For example, the CPU 101 carries out the communication via the network 30, receives and gives data from and to the user, reproduces and clips contents from recording media, stores contents into the HDD 105, manages the contents stored in the HDD 105, and retrieves information via the network 30 in accordance with clip information or the like. The terminal apparatus 10 of the present embodiment can record and play back the audio content data and moving-picture content data. The CPU 101 exchanges control signals and data with the other circuits through the bus 102.

The ROM (Read Only Memory) 103 stores the application programs that the CPU 101 should execute. It stores a program loader, various operation coefficients, parameters for use in executing the programs, and the like. The RAM (Random Access Memory) 104 may store the programs the CPU 101 should execute. The RAM 104 can be used as a data region and a task region, which the CPU 101 needs when it executes various processes.

The input unit 107 has operation keys and various input devices, which are provided on the housing of the terminal apparatus 10. The input devices include a jog dial and a touch panel. The input unit 107 may have a keyboard and a mouse, which serve as GUIs (Graphical User Interfaces). The information input at the input unit 107 is supplied to the input-processing unit 106. The unit 106 performs a specific process on the information, generating an operation command. The command is supplied to the CPU 101. In response to the operation command, the CPU 101 carries out an operation or a control.

The display device 17a is, for example, a liquid crystal display and displays various kinds of information. When the CPU 101 supplies displayed information to the display-processing unit 108 in accordance with various operating states, input states and communications states. The display-processing unit 108 drives the display device 17a on the basis of the displayed information to execute display operation. The display device 17a displays, for example, the contents of the related information distributed from the servers or the contents of the clip information. If any musical piece is retrieved via the network 30, the display device 17a will display the result of the retrieval.

The media drives 109a and 109b can record and reproduce contents, such as musical pieces, on and from a portable recording medium. (They can only reproduce contents from a recording medium, depending upon the type of the medium.) The media drives 109a and 109b can record and reproduce data on and from different types of recording media, not on and from the same type of a recording medium. In other words, the media drives 109a and 109b can record and reproduce on and from a plurality of recording medium. For instance, the media drive 109a reproduces data from CDs and DVDs, while the media drive 109b records and reproduces data on and from MDs.

The portable media in which contents such as musical pieces are recorded are not limited to optical recording media such as CDs, DVDs, MDs and the like. Rather, the media drives 109a and 109b can store contents in, for example, semiconductor memories such as flash memories. In this case, a flash memory reader/writer is connected to the bus 102.

The user may insert a recording medium in which arbitrary contents are recorded (e.g., CD, DVD, MD, or the like) into the media drive 109a or 109b and operates the remote controller 40. Then, the user can enjoy listening to musical pieces or the like. Assume that the user operates the remote controller 40, instructing that the media drive 109a should reproduce the contents of the recording medium. Then, the CPU 101 instructs the media drive 109a to reproduce the contents. Thus, the media drive 109a accesses the contents designated from the inserted recording medium and reads a designated musical piece or pieces from the medium.

The contents thus read may be audio contents. In this case, the CPU 101 first decodes, if necessary, the audio contents and then transfers the contents to the audio-information-processing unit 121. The audio-information-processing unit 121 performs sound-field process such as equalizing, sound-volume adjustment, D/A conversion, amplification and the like on the audio contents. The audio contents, thus processed, are output from the speaker unit 120. The speaker unit 120 comprises the speakers 25a and 25b that are shown in FIG. 3. Thus, the speaker unit 120 can output stereophonic sound.

The CPU 101 can make the HDD 105 accumulate the contents reproduced by the media drives 109a and 109b, in the form of an audio-data file. The audio-data file can assume various formats. It may take the CD format. If this is the case, the contents are digital audio data obtained through 16-bit quantization at the sampling frequency of 44.1 KHz. Alternatively, the audio-data file may take the compressed-data format in order to save the storage capacity of the HDD 105. In this case, the data-compressing scheme is not limited to a particular one. ATRAC (Advanced Transform Acoustic Coding, trademark), MP3 (MPEG Audio Layer-3), or the like can be employed.

The tuner unit 11b is, for example, an AM-FM radio tuner. When controlled by the CPU 101, the tuner unit 11b demodulates the broadcast signal that the antenna 11a has received. Needless to say, the tuner unit 11b can be a television tuner, a broadcast-satellite tuner, or a digital-broadcast tuner. The broadcast signal thus demodulated undergoes a specific process in the audio-information-processing unit 121. The broadcast signal is output from the speaker unit 120 as broadcast.

When controlled by the CPU 101, the communications process unit 161 encodes the data to be transmitted and decodes the data received. The network interface 102 transmits the data encoded by the communications process unit 161 to predetermined external apparatuses via the network 30. The network interface 102 also transmits signals transmitted from the external apparatuses via the network 30 to the communications process unit 161. The communications process unit 22 transfers the information it has received, to the CPU 101. The information received through the network 30 includes, for example, the information related to the FM programs being broadcast and the titles of the musical pieces contained in a CD or the like.

The infrared-ray communications unit 181 achieves wireless communications, such as infrared-ray communications, with the remote controller 40. The infrared-ray communications unit 181 performs a particular process on the signal sent from the remote controller 40, generating an operation command. This command is supplied to the CPU 101. In response to the operation command, the CPU 101 performs an operation or a control so that the apparatus 10 may operate.

The configuration of the terminal apparatus 10 is not limited to the one illustrated in FIG. 4. The apparatus 10 can have various configurations. For example, the apparatus 10 may have an interface that accomplishes communication with the peripheral apparatuses. The interface may be an USB (Universal Serial Bus), an IEEE 1394, a Bluetooth, or the like. In the terminal apparatus 10, the HDD 105 can store the contents of the audio data downloaded by the network interface 102 via the network 30, and the contents of the audio data transferred through the interface such as the USB, IEEE 1394 or the like. The terminal apparatus 10 may have a terminal for connecting a microphone or an external headphone, a video-output terminal for use in reproducing data from a DVD, a line-connecting terminal, a terminal for transferring optical digital data, and the like. Further, the terminal apparatus 10 may have a PCMCIA slot, memory-card slots, and the like. Hence, the terminal apparatus 10 can exchange data with external information-processing apparatuses and audio apparatuses.

The program modules incorporated in the system according to the present embodiment will be described. The program modules describe the various processes that the terminal apparatus 10 can carry out. That is, the terminal apparatus 10 can perform the processes in accordance with the program modules, respectively. Hereinafter, the functions that the apparatus 10 performs in accordance with the program modules shall be distinguished by using the names of the program modules.

Figure 5:
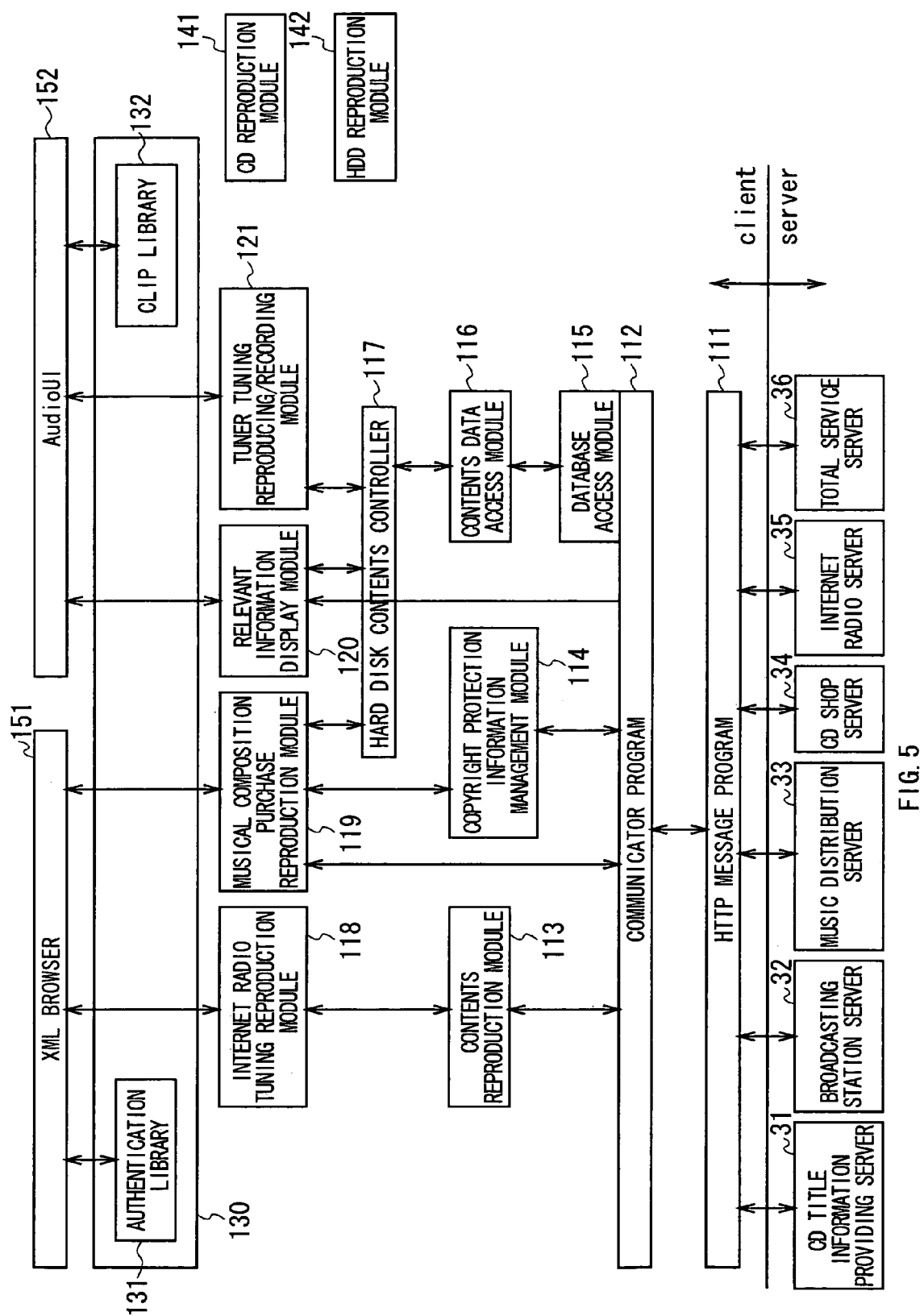
FIG. 5 is a diagram showing the program module configuration of the terminal apparatus.

FIG. 5 is a diagram showing the program modules of the terminal apparatus 10. As seen from FIG. 5, the program modules for the terminal apparatus 10 are designed to work on the OS. Using the program modules, the terminal apparatus 10 can perform data communication with the CD-title information server 31, broadcast-station server 32, music distributing server 33, CD-shop server 34, integrated service server 35, Internet-radio server 36 and some other servers.

The HTTP (Hyper Text Transfer Protocol) message program 111 accomplishes HTTP communication between the terminal apparatus 10 and the various servers, such as the CD-title information server 31, broadcast-station server 32, CD-shop server 34 and integrated service server 35. The communicator program 112 is a communications module that performs data communication with the integrated service server 35, etc.

A content-playback module 113 and a copyright protection information management module 114 are provided as higher-order modules to the communicator program 112 (functioning like a user interface). The content-playback module 113 interprets and reproduces the codec of contents. The copyright protection information management module 114 manages the information concerning the protection of copyright. An Internet-radio station selection/playback module 118 is provided as a higher-order module to the content-playback module 113. The module 118 selects an Internet-radio station and reproduces the data broadcast by the Internet-radio station selected. A music-purchase playback module 119 is provided as a higher-order module to copyright protection information management module 114. The module 119 is used to buy musical pieces and can reproduce the musical pieces bought.

As higher order modules to the Internet-radio station selection/playback module 118 and music-purchase playback module 119, an XML (extensible Markup Language) browser 151 is provided. The XML browser 151 interprets the XML files sent from various servers and causes the display device 17 to display information. The XML browser 151 interprets the data the user inputs by operating the terminal apparatus 10 while the apparatus 10 remains in the integrated-service using mode. A process request corresponding to the data input is transferred from the XML browser 151 to other modules. For example, a musical piece selected by the user via the XML browser 151 is purchased by the music-purchase playback module 119 and is written into the HDD 21 via a hard-disc content controller 117.

An authentication library 131 is connected to the communicator program 112. The authentication library 131 is designed to authenticate the integrated service server 35 and the other servers.

There are three other higher-order modules to the communicator program 112. They are a database accessing module 115, a content-data accessing module 116, and the hard-disc content controller 117. The database accessing module 115 can access the various databases provided in the HDD 21. The content-data accessing module 116 can access the contents stored in the HDD 21. The hard-disc content controller 117 manages the contents stored in the HDD 21.

There are three higher-order modules to the hard-disc content controller 205. They are a related-information displaying module 120, a tuner-station reproducing/recording module 121 and the music-purchase playback module 119. The related-information displaying module 120 makes the display device 17 display the titles of the musical pieces broadcast by radio stations and the names of the artists who play the musical pieces. The tuner-station reproducing/recording module 121 selects radio stations and causes the HDD 21 to record the contents of the musical pieces broadcast by any radio station selected.

For example, the musical pieces received from the radio station selected, via an audio-user interface (AudioUI) 152, is written into the HDD 21 trough the content-data accessing module 116.

The related-information displaying module 120 receives music-related information via the HTTP message program 111 from the CD-title information server 31 and the broadcast-station server 32. The music-related information represents the titles of the musical pieces being broadcast from the radio station and the names of the artists who play these musical pieces, the radio station being selected by the tuner-station reproducing/recording module 121. The module 120 supplies this information via the audio-user interface 152 to the display device 17.

The related information that the display device 17 receives via the audio-user interface 152 and can be temporarily stored in clip library 132 of a library 130. The related information can be stored into the HDD 21 through the database accessing module 115.

The terminal apparatus 10 further includes two program modules, i.e., CD-playback module 141 and HDD-playback module 142. The CD-playback module 141 reproduces data from CDs, and the HDD-playback module 142 reproduces data from hard disks. The reproduction results are output via the audio-information-processing unit 24 and the speaker unit 25.

In the terminal apparatus 10 thus configured, the related information acquired from servers can be clipped. At the same time, a process can be carried out to retrieve and buy musical pieces.

The internal structure of the integrated service server 35 will be explained.

Figure 6:
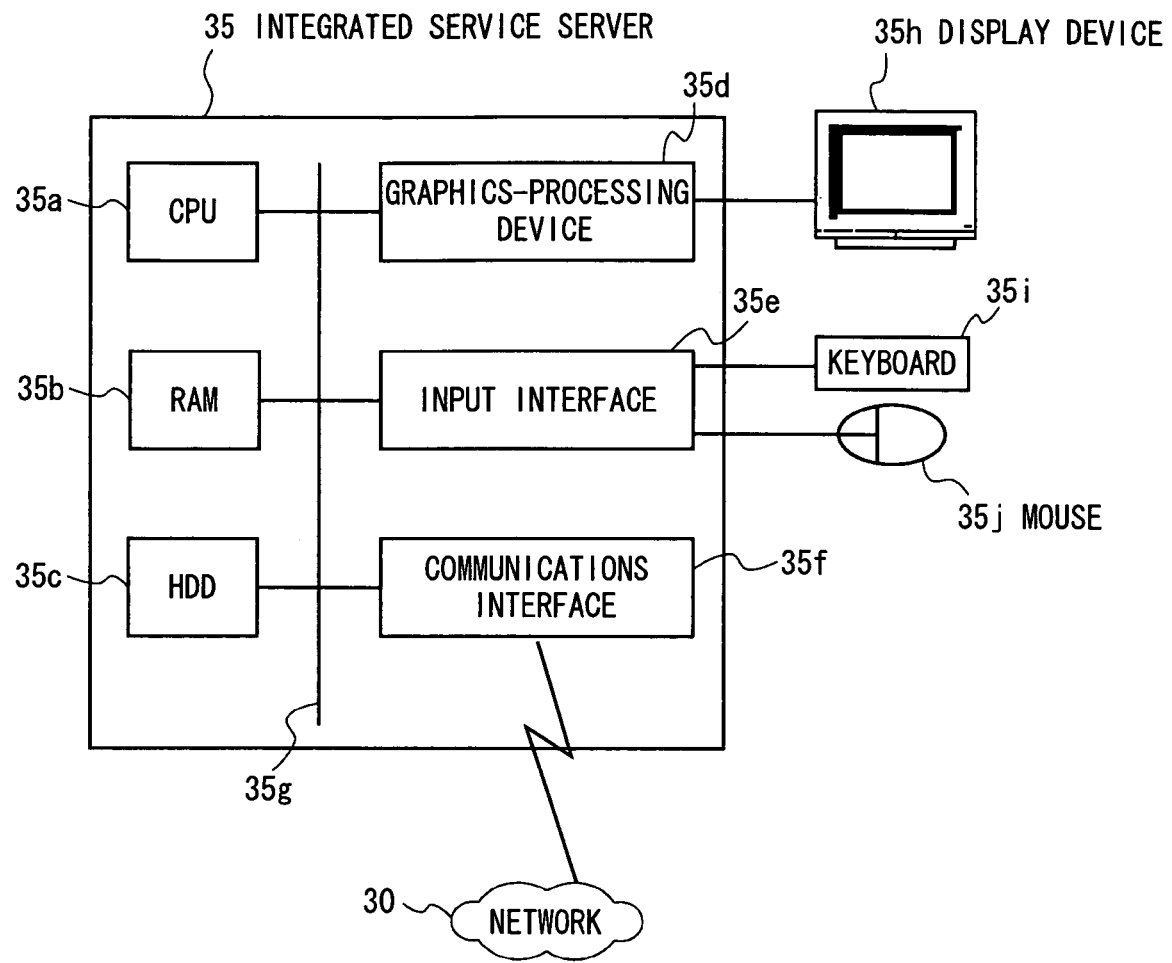
FIG. 6 is a block diagram illustrating the hardware configuration of the integrated service server.

FIG. 6 is a hardware block diagram of the integrated service server. As FIG. 6 shows, the server 35 is entirely controlled by a CPU 35a. The bus 35g connects the RAM 35b, HDD 35c, graphics-processing device 35d and input interfaces 35e and communications interface 35f to the CPU 35a.

The RAM 35b temporarily stores the OS (Operating System) program and at least a part of the application program that works to supply various data items to the terminal apparatus 10. The RAM 35b stores various data items that the CPU 35a needs to use to perform its functions. The HDD 35c stores the OS program and application programs for providing information.

A monitor 35h is connected to the graphics-processing device 35d. The graphics-processing device 35d causes the monitor 35h to display images in accordance with a command sent from the CPU 35a. A keyboard 35i and a mouse 35j are connected to the input interface 35e. The input interface 35e receives signals from the keyboard 35i and mouse 35j and supplies the signals to the CPU 35a through the bus 35g.

The communications interface 35f is connected to the network 30. The interface 35f transmits and receives signals to and from the terminal apparatus 10 and various servers through the network 30.

Such a hardware configuration realizes a process function of the present embodiment. FIG. 6 shows the hardware configuration of the integrated service server 35. Any other server can be realized by similar hardware configuration.

How the user is registered in the integrated service server 35 will be explained. To receive various kinds of service, the user must register himself or herself in the integrated service server 35. Thus, the user operates the terminal apparatus 10, inputting data items required to register himself or herself. The data items are transmitted to the integrated service server 35. The terminal apparatus 10 then acquires a user ID and a password. At this time, the user must input a terminal ID to the terminal apparatus 10. The user may have two or more terminal apparatuses. In this case, the terminal ID is an identifier that distinguishes the terminal apparatus from any other terminal apparatuses and that is arbitrarily input by the user. The CPU 11 transmits the terminal ID to the integrated service server 35, which registers the terminal ID. The terminal ID is stored in the ROM 13 or HDD 21.

Figure 7:
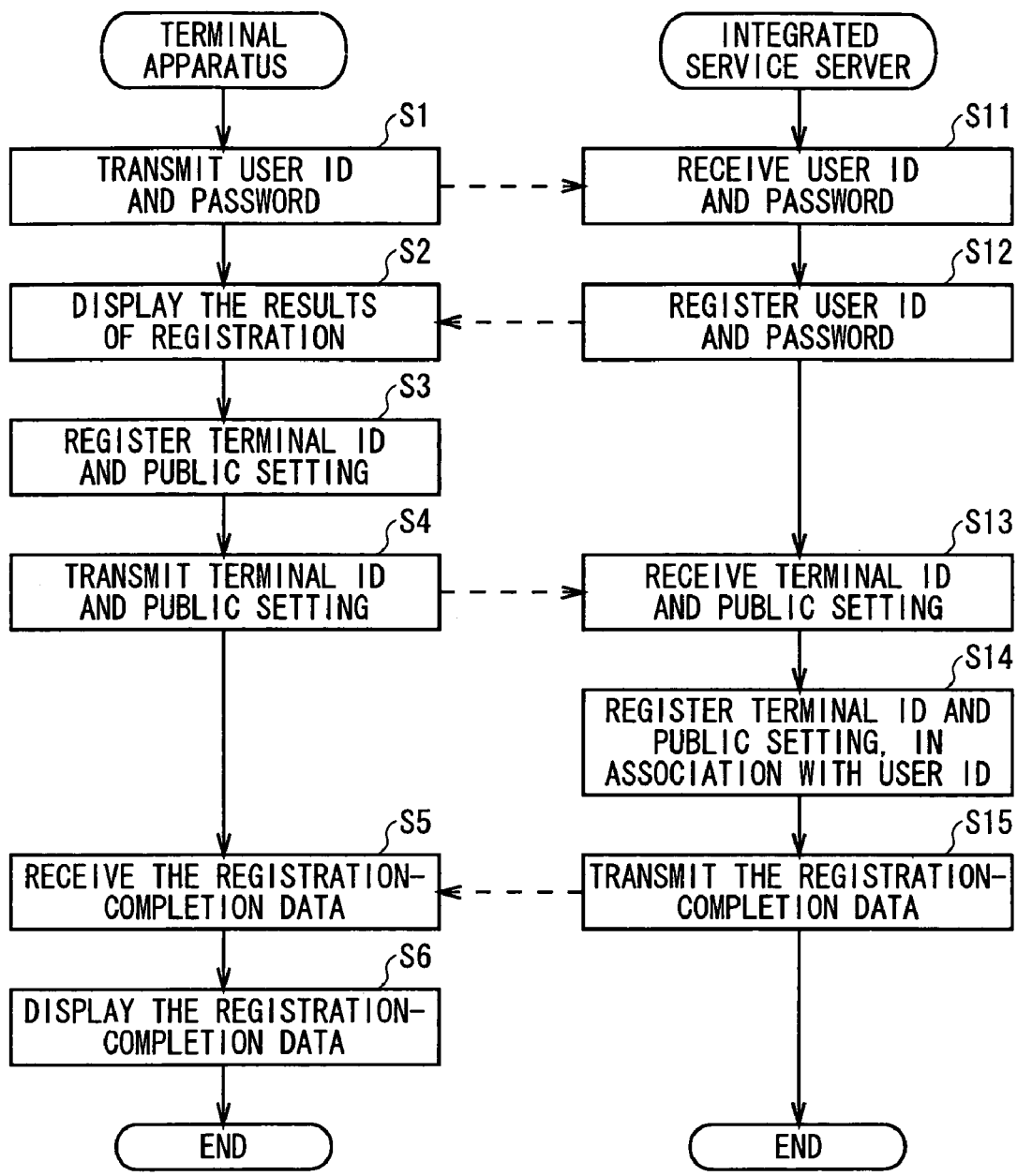
FIG. 7 is a sequence chart representing the sequence of registering the user.

The sequence of registering the user will be described, with reference to the sequence chart of FIG. 7. FIG. 7 is a sequence chart showing the sequence of registering the user.

In Step S1, the CPU 11 of the terminal apparatus 10 transmits the user ID and password input by the user, as a part of registration information, to the integrated service server 35. An SSL (Secure Socket Layer) is used in the communication between the terminal apparatus 10 and the integrated service server 35, this preventing the information from leaking to a third party.

In Step S11, the CPU 35a of the integrated service server 35 receives the user ID and password as a part of the registration information.

In Step S12, the CPU 35a compares the user ID and the password received with the management table stored in the HDD 35c. If the management table contains no user IDs identical to the user ID input, the user ID input is registered in the management table. The CPU 35a transmits the user-registration completion data indicating that the user ID input has been registered, to the terminal apparatus 10. If the management table contains a user IDs that is identical to the user ID input, the CPU 35a transmits a message to the terminal apparatus 10, asking the user to input a different user ID. The user operates the apparatus 10, inputting a different user ID and a password. The terminal apparatus 10 transmits the user ID and password newly input.

In Step S2, the CPU 11 of the terminal apparatus 10 makes the display device 17 displays the completion of the registration of the user ID, in accordance with the received user-registration completion data.

In Step S3, the CPU 11 stores the terminal ID and the public setting into the HDD 21 of the terminal apparatus 10, as the user operates the terminal apparatus 10 to register himself or herself. The public setting is data that indicates whether or not the existence of the terminal apparatus 10 is disclosed to other users.

In Step S4, the CPU 11 transmits the terminal ID and the public setting, as the remaining part of the registration information, to the integrated service server 35.

In Step S13, the CPU 35a of the integrated service server 35 receives the terminal ID and the public setting, i.e., the remaining part of the registration information, from the terminal apparatus 10.

In Step S14, the CPU 35a registers the terminal ID and public setting in the management table, in association with the user ID that has already been registered in the management table.

In Step S15, the CPU 35a transmits registration-completion data to the terminal apparatus 10, informing the user that the terminal ID and the public setting have been registered. Thus, the user is registered in the integrated service server 35.

In Step S5, the CPU 11 of the terminal apparatus 10 receives the registration-completion data from the integrated service server 35.

In Step S6, the CPU 11 causes the display device 17 to display the registration-completion data, informing the user that he or she has been duly registered. Thus ends the process of registering the user.

The CPU 11 stores the user ID and password received from the user, into the RAM 20. The CPU 11 stores the terminal ID into the ROM 13 or the HDD 21. If the server must be accessed again, for example, the power supply is disconnected, the user ID and the password, both stored in the RAM 20 are used again unless they are deleted. Labor of inputting them can therefore be saved. The terminal ID will not be deleted; they remain stored in the ROM 13 or the HDD 21.

A ticket is issued to the user (terminal apparatus 10) when the user is authenticated by the integrated service server 35. The terminal apparatus 10 can therefore access various servers that provide service. The servers refer to the time data contained in the ticket and representing the time when the user is authenticated, and determine whether the user has been recently authenticated as authorized user (for example, within the past one minute). If the user is so verified, they provide service requested by the terminal apparatus 10.

How the user is registered will be described. The user may be registered as a single user or a multi-user. First, it will be explained how the user is registered as single user.

Figure 8:
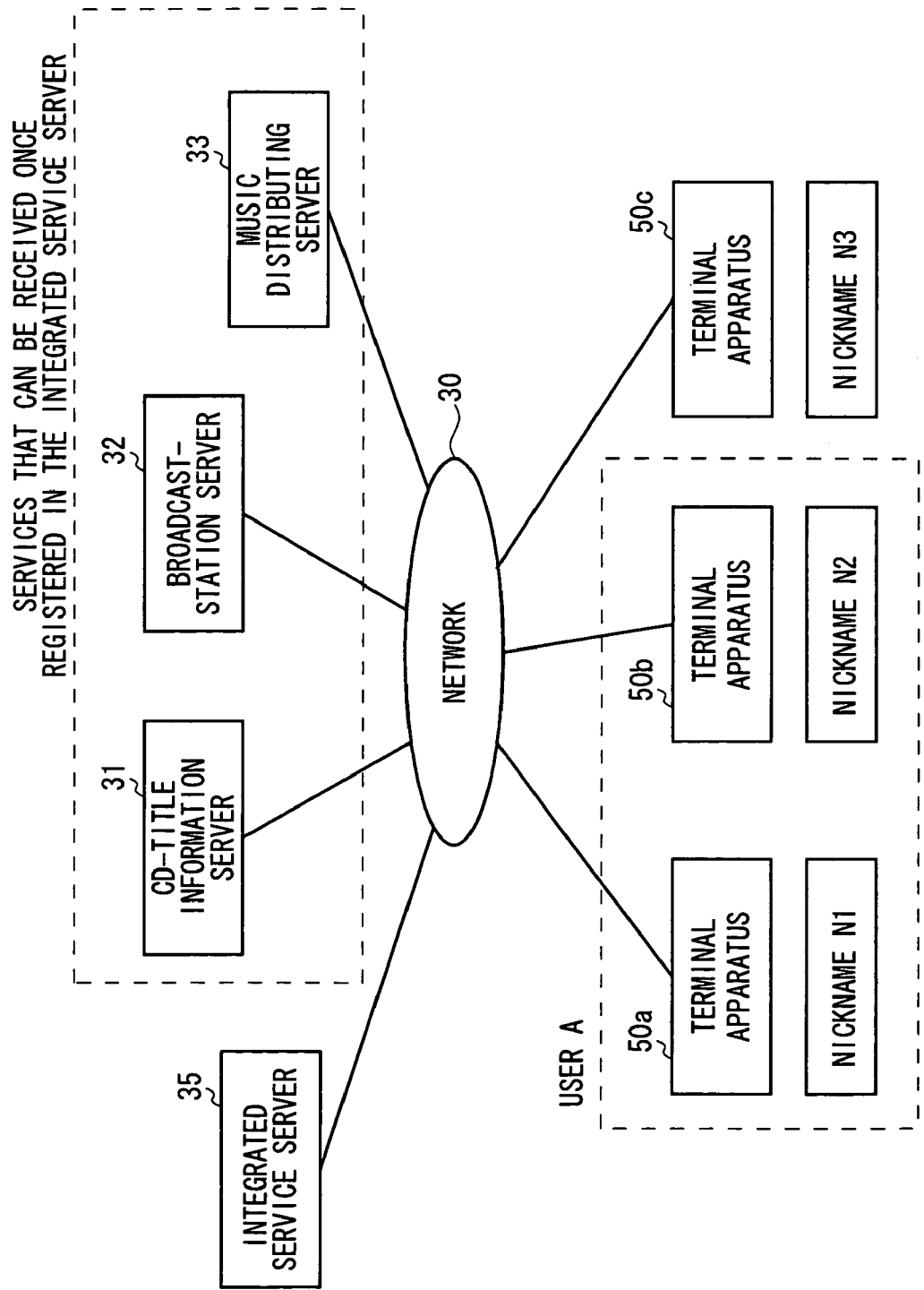
FIG. 8 is a diagram explaining a method of registering a single user.

FIG. 8 is a diagram explaining a method of registering a single user. Terminal apparatuses 50a to 50c shown in FIG. 8 have the same outer appearance as the terminal apparatus 10 shown in FIG. 3. They have hardware blocks similar to those of the terminal apparatus 10, which are shown in FIG. 4. Assume that a user A possesses the terminal apparatuses 50a and 5b, and that another user possesses the terminal apparatus 50c. Once the users have been registered in the integrated service server 35, they can receive any service from the CD-title information server 31, broadcast-station server 32 and music distributing server 33.

Assume that the user A receives service from the integrated service server 35 (that is, he or she has been registered as user). The user has user ID registered in the integrated service server 35. The terminal apparatuses 50a and 50b have nicknames (terminal IDs) N1 and N2, respectively. The nicknames have been assigned by the user and are apparatus ID data items. The nicknames N1 and N2 are stored, respectively, in the HDDs of the terminal apparatuses 50a and 50b. In each terminal apparatus the same user possesses, the nickname (terminal ID) is unique. The nickname need not be unique in a terminal apparatus that receives service from the integrated service server 35. In other words, terminal apparatuses may have the same nickname if they are not possessed by the same user. In this manner, who can receive which service can be determined by the combination of the user ID and nickname. Thus, the user A can receive service from the CD-title information server 31, broadcast-station server 32 and music distributing server 33. Once assigned, a nickname cannot be changed at all.

It will be explained how the user is registered as multi-user.

Figure 9:
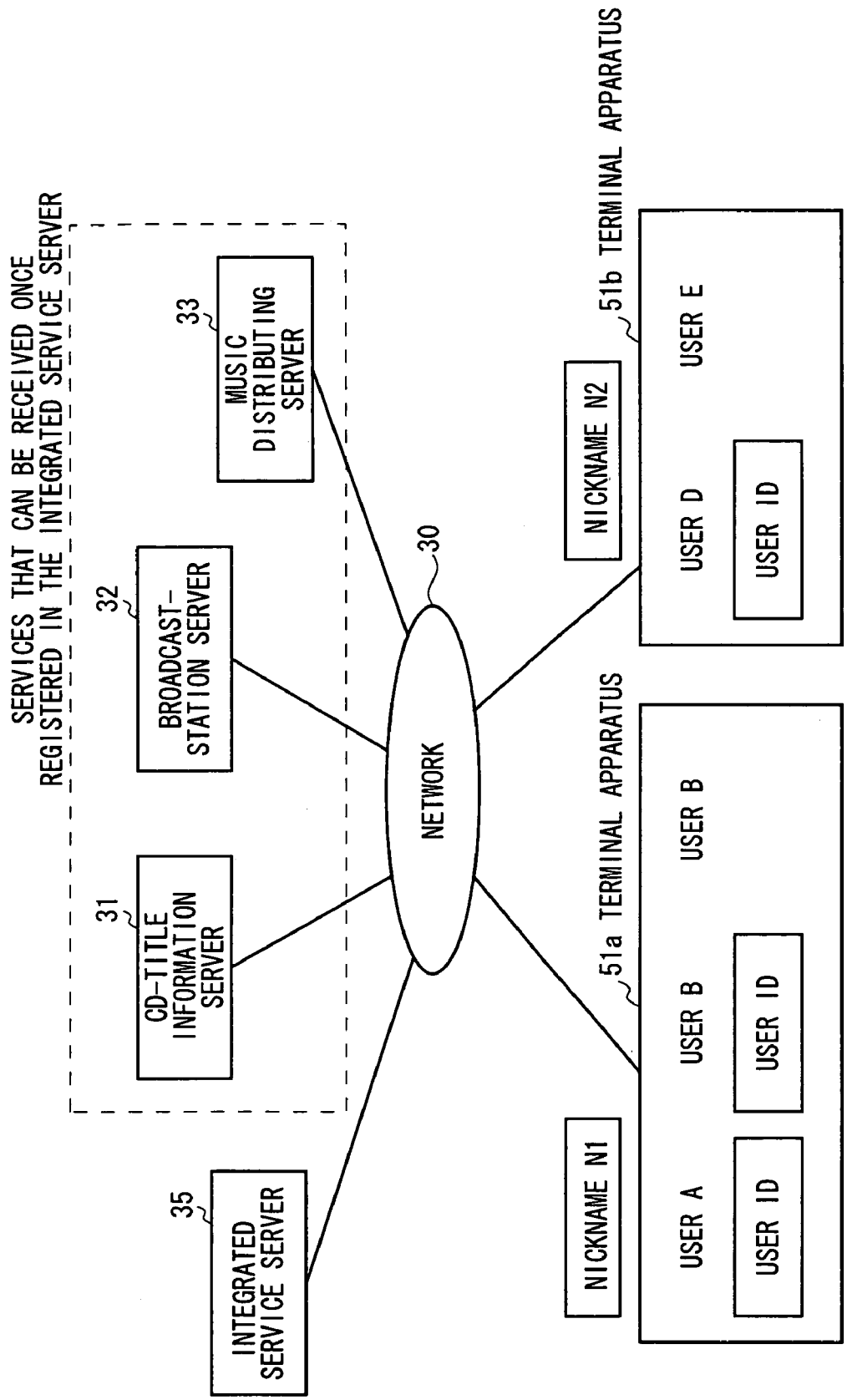
FIG. 9 is a diagram explaining a method of registering a multi-user.

FIG. 9 is a diagram explaining a method of registering a multi-user. Terminal apparatuses 51a and 51b shown in FIG. 9 have the same outer appearance as the terminal apparatus 10 shown in FIG. 3. They have hardware blocks similar to those of the terminal apparatus 10, which are shown in FIG. 4. The terminal apparatus 51a is of a multi-user type and can be used by users A to C. The terminal apparatus 51b can be used by users D and E. Once the users A to E has been registered in the integrated service server 35, they can receive any service from the CD-title information server 31, broadcast-station server 32 and music distributing server 33.

The terminal apparatuses 51a and 51b have nicknames N1 and N2, i.e., terminal IDs, respectively, so that they may receive service from the integrated service server 35. Assume that the users A and B have been registered as users in the integrated service server 35 and have user IDs. Also assume that the user C has not been registered as a user in the integrated service server 35 and has no user IC, that the user D has been registered as a user in the integrated service server 35 and has a user ID, and that the user E has not been registered as a user in the integrated service server 35 and has no user IC. Hence, of the users A to C who can use the terminal apparatus 51a, only the users A and B can receive service from the CD-title information server 31, broadcast-station server 32 and music distributing server 33. Of the users D and E who can use the terminal apparatus 51b, only the user D can receive service from the CD-title information server 31, broadcast-station server 32 and music distributing server 33. Who can receive which service can thus be determined by the combination of the user ID and nickname.

A process of staring service will be explained, with reference to a flowchart.

Figure 10:
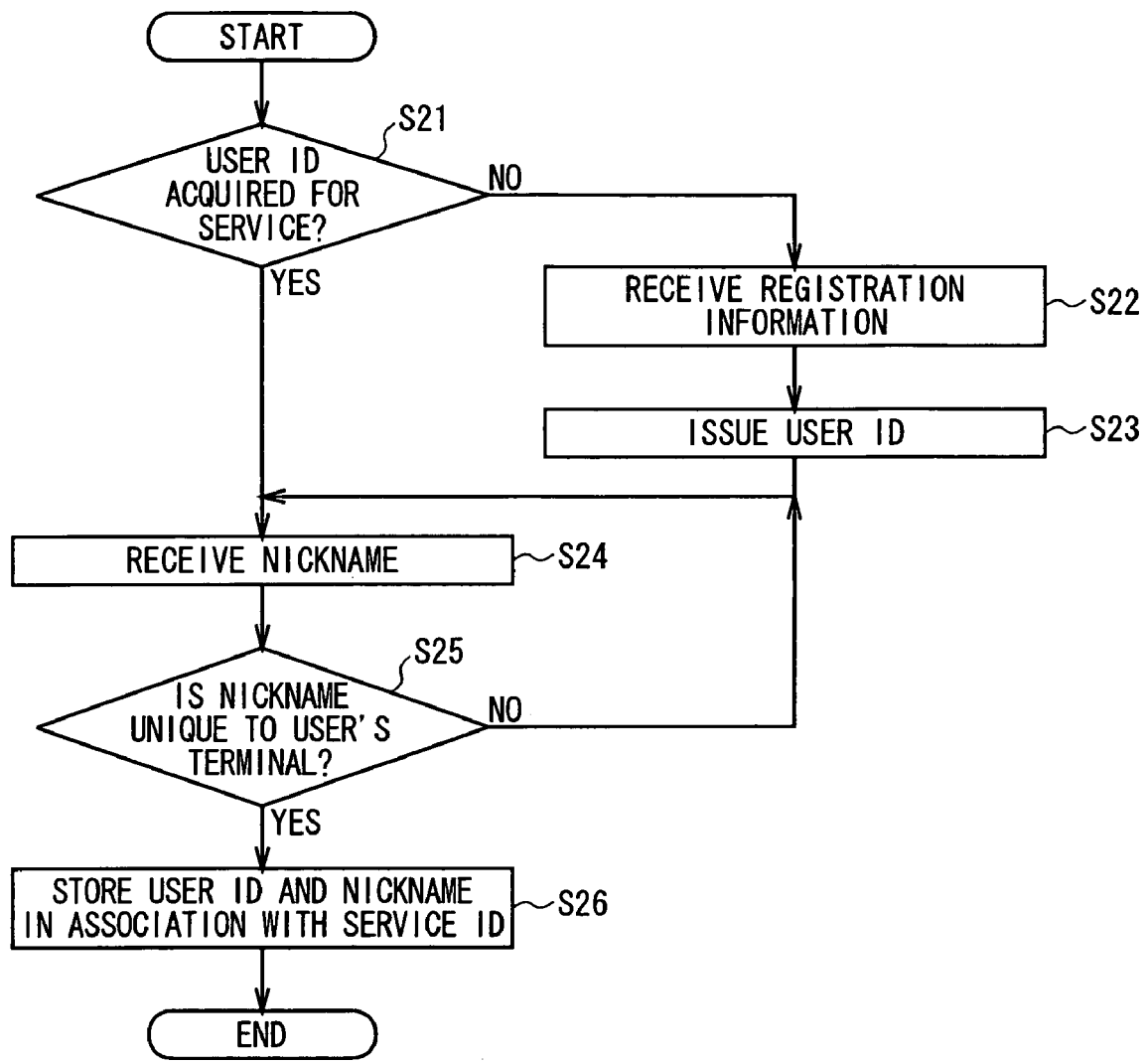
FIG. 10 is a flowchart explaining the process of starting service.

FIG. 10 is a flowchart explaining the process of starting service. Assume that one user possesses a plurality of terminal apparatuses.

In Step S21, the CPU 35a provided in the integrated service server 35 receives the user ID of the user from the terminal apparatus 10. If the CPU 35a receives no user ID, this means that the user has not obtained the user ID. In this case, the process goes to Step S22. If the CPU 35a receives the user ID, that is, if the user has obtained the user ID, the process goes to Step S24.

In Step S22, the CPU 35a receives registration information from the terminal apparatus 10. The registration information is indispensable for registering the user.

In Step S23, the CPU 35a issues an user ID. In Steps S22 and S23, the user inputs his or her user ID as described with reference to FIG. 7. The CPU 35a issues the user ID only if the user ID input is not identical to the user ID of any other user.

In Step S24, the CPU 35a receives the terminal ID (nickname) from the terminal apparatus 10.

In Step S25, the CPU 35a determines whether the nickname received is unique in the terminal apparatus that the user possesses. If the nickname assigned by the user is not unique, the process goes to Step S24. If the nickname is unique, the process goes to Step S26.

In Step S26, the CPU 35a stores the service ID, user ID and nickname, in mutual association, in the HDD 35c. The service ID is data that identifies the service. The type of service, which the user receives, differs from user to user. For instance, a user may receive NowOn-Air service only, while another user may receives NowOn-Air service and music-distributing service. Note that the service ID identifies the service that the user wants to receive.

The service ID designates the service that the user has selected when he or she is registered, wishing to receive it. The service ID is transmitted from the terminal apparatus 10 to the integrated service server 35 and recorded in the HDDs 21 and 35c.

A process of authenticating the user will be explained. To receive service from the integrated service server 35, the user operates the terminal apparatus 10, transmitting the user ID, password, terminal ID and service ID to the integrated service server 35.

In the integrated service server 35, the CPU 35a authenticates the user in accordance with the user ID, password, and terminal ID. On authenticating the user, the CPU 35a issues a ticket that allows the user to access various servers in accordance with the service ID to the terminal apparatus 10. The terminal apparatus 10 receives the ticket and makes an access to the servers that can provide service in accordance with the received ticket. Thus, the user can receive the service.

Figure 11:
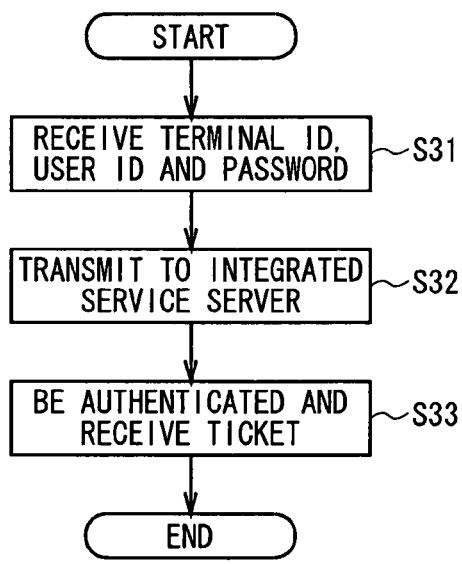
FIG. 11 is a flowchart illustrating the sequence of authenticating the user.

FIG. 11 is a flowchart showing the sequence of authenticating the user.

In Step S31, the CPU 11 provided in the terminal apparatus 10 receives the user ID and password from the user. The CPU 11 acquires the terminal ID from the HDD 21.

In Step S32, the CPU 11 of the terminal apparatus 10 transmits the terminal ID thus acquired, the service ID designating the service the user receives and the password, to the integrated service server 35.

In the integrated service server 35, the terminal ID, user ID and password, all received, are used to authenticate the user. If the CPU 11 authenticates the user, it issues a ticket to the terminal apparatus 10. The ticket that can allow the user to access the server that can provide service designated by the service ID.

In Step S33, the CPU 11 of the terminal apparatus 10 receives the ticket. The CPU 11 makes an access to the server that can provide the service in accordance with the received ticket. The process of authenticating the user will be explained in more detail, in conjunction with the second embodiment that will be described later.

A process of canceling service will be explained. To cancel the service, the user operates the terminal apparatus 10, transmitting a request for deleting the apparatus ID data, to the integrated service server 35. At this time, the terminal apparatus 10 transmits the user ID, password and terminal ID, together with the request.

In the integrated service server 35, the CPU 35a receives, from the terminal apparatus 10, the request for deleting the terminal ID, along with the user ID, password and terminal ID that identifies the terminal apparatus 10. On receiving the request for deleting the terminal ID, the CPU 35a deletes the service ID from the HDD 35c. Subsequently, the CPU 35a delete the terminal ID. At this time, it deletes the user ID and the password, too.

Figure 12:
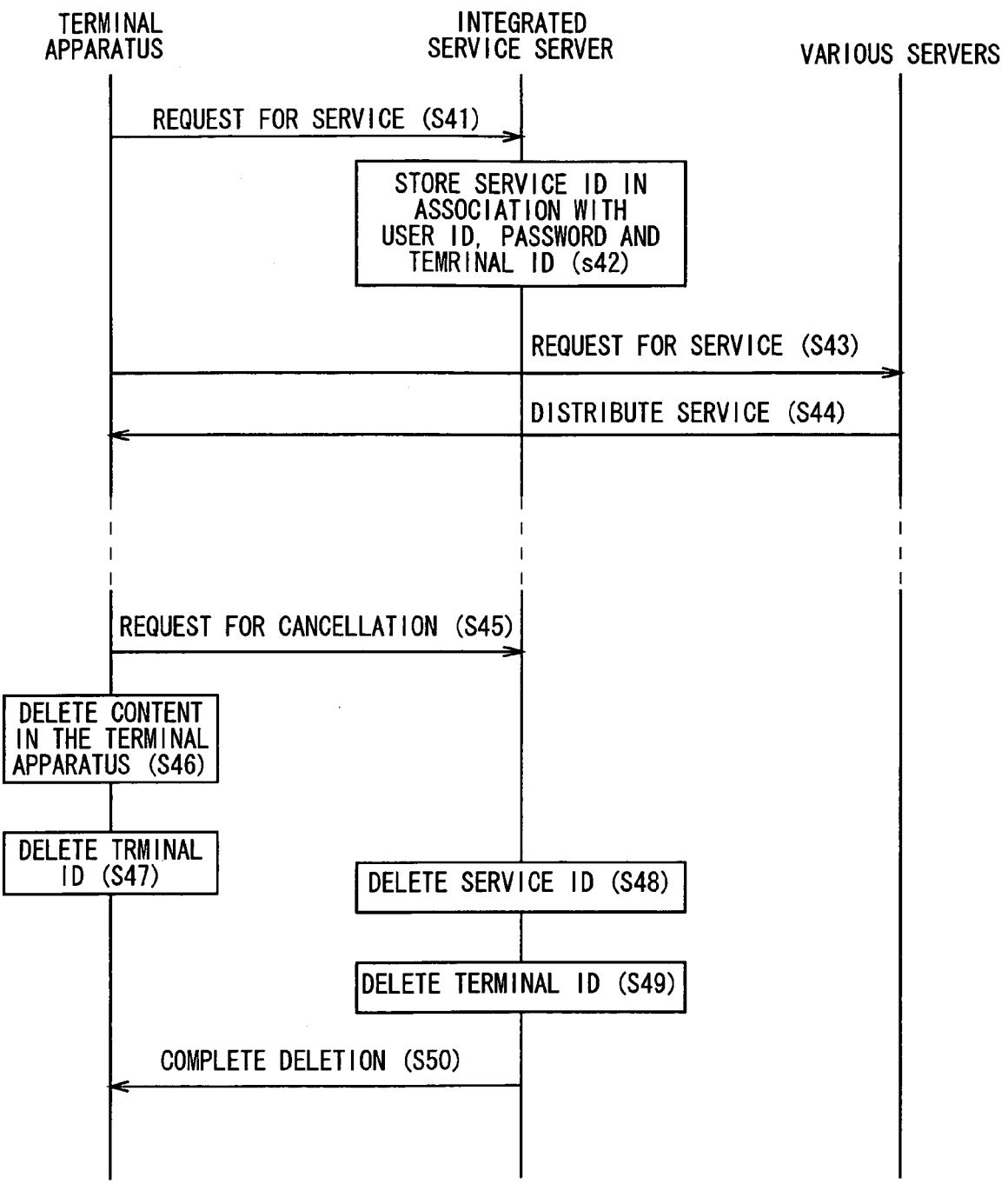
FIG. 12 is a sequence chart showing the sequence of a process of canceling service.

FIG. 12 is a sequence chart showing the first sequence of the process of canceling various services. The "various servers" are the CD-title information server 31, broadcast-station server 32, music distributing server 33, CD-shop server 34, and the like.

In Step S41, the CPU 11 of the terminal apparatus 10 transmits a request for service, received from the user, to the integrated service server 35.

In Step S42, the CPU 35a of the integrated service server 35 stores the user ID, password and terminal ID of the user who has requested for the service, in the HDD 35c, in association with the service ID that identifies the service requested.

In Step S43, the CPU 11 of the terminal apparatus 10 request that the server should provide the service requested. From the integrated service server 35, the CPU 11 receives a ticket for accessing the server from which should provide the service. The CPU 11 accesses the server in accordance with the ticket.

In Step S44, the server distributes the service as requested.

The terminal apparatus 10 therefore receives the service. To cancel the receipt of the service, the process goes to the next step.

In Step S45, the CPU 11 of the terminal apparatus 10 transmits a request for canceling the service to the integrated service server 35, together with the user ID, password and terminal ID.

In Step S46, the CPU 11 deletes the content provided from the server and stored in the HDD 21.

In Step S47, the CPU 11 deletes the terminal ID from the HDD 21.

In Step S48, the CPU 35a of the integrated service server 35 deletes the service ID from the HDD 35c.

In Step S49, the CPU 35a deletes the terminal ID from the HDD 35c. At this time, it deletes the user ID and the password, too.

In Step S50, the CPU 35a transmits information to the terminal apparatus 10, informing that the terminal ID has been deleted. The terminal apparatus 10 may perform the process of Steps S46 and S47 when it receives the information indicating that the terminal ID has been deleted from the integrated service server 35.

Figure 13:
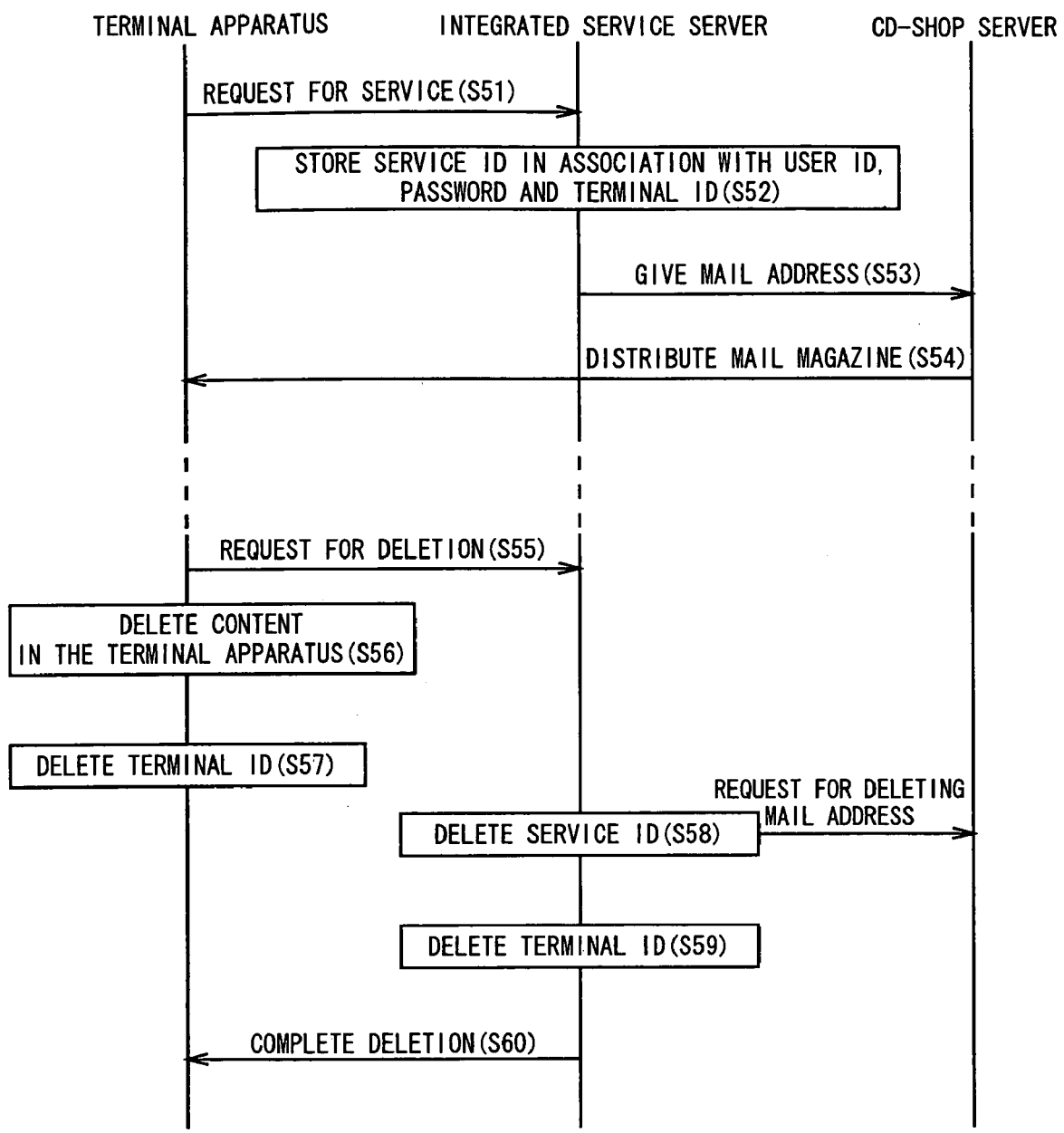
FIG. 13 is a sequence chart showing the second sequence of canceling service.

FIG. 13 is a sequence chart showing the second sequence of canceling service. The CD-shop server 34 periodically performs the service of distributing a mail magazine to the user whose mail address has been registered.

In the integrated service server 35, the HDD 35c stores the user ID, password, mail address and terminal ID.

In Step S51, the CPU 11 of the terminal apparatus 10 transmits a request for mail-magazine service, to the integrated service server 35, as the user operates the terminal apparatus 10. The mail-magazine service is periodical transmission of mail magazines from various servers.

In Step S52, the CPU 35a of the integrated service server 35 stores the user ID, password and terminal ID of the user who has requested for the service, in the HDD 35c, in association with the service ID that identifies the mail-magazine service requested.

In Step S53, the CPU 35a of the integrated service server 35 gives the CD-shop server 34 the mail address of the user who has requested for the mail-magazine service. At this time, the CD-shop server 34 adds the notified mail address to the list of mail-magazine destinations, which is stored in an internal storage means.

In Step S54, the CD-shop server 34 distributes a mail magazine to the terminal apparatus 10. The CD-shop server 34 keeps distributing, at intervals, the mail magazine to the destination the mail address of which is registered in the list of mail-magazine destinations.

The terminal apparatus 10 therefore receives the service. To cancel the receipt of service, the apparatus 10 carries out the following steps.

In Step S55, the CPU 11 of the terminal apparatus 10 transmits information requesting for cancellation of the receipt of mail-magazine service, to the integrated service server 35, along with the user ID, password and terminal ID.

In Step S56, the CPU 11 deletes the content (including the mail magazine) provided by the service from the server and stored in the HDD 21.

In Step S57, the CPU 11 deletes the terminal ID from the HDD 21.

In Step S58, the CPU 35a of the integrated service server 35 deletes the service ID from the HDD 35c. It then transmits a request to the CD-shop server 34, in order to delete the mail address of the user of the terminal apparatus 10 from the list of mail-magazine destinations.

In Step S59, the CPU 35a deletes the terminal ID from the HDD 35c. At this time, the CPU 35a deletes the user ID and the password, too.

In Step S60, the CPU 35a transmits information to the terminal apparatus 10, informing that the terminal ID has been deleted. The terminal apparatus 10 may perform the process of Steps S56 and S57 when it receives the information indicating that the terminal ID has been deleted from the integrated service server 35.

The terminal ID is thus deleted from the integrated service server 35 after the service ID is deleted. Hence, the service ID has been deleted even if a trouble develops when the terminal ID is deleted. As a result, the integrated service server 35 would not keep storing the service ID only. This prevents the mail magazine from being continuously distributed to the user's mail address of the terminal apparatus 10.

With the configuration described above, the service ID is deleted before the terminal ID is deleted, which is the information required for the access to the integrated service server 35. There is no risk that the integrated service server 35 can no longer be accessed in order to delete the service ID. Therefore, the service ID can be reliably deleted.

Once the service of the integrated service server 35 has been canceled, all services (i.e., services provided by the various servers) can be canceled. This saves the labor of canceling the services of the various servers, on the part of the terminal apparatus 10.

Since the content is deleted from the terminal apparatus 10, the user need not worry about any possible copyright problems.

(3) Second Embodiment

The second embodiment performs a process of registering the user, a process of staring service, and a process of canceling service, which are similar to the process (FIG. 7), the process (FIGS. 10 and 11), and the process (FIGS. 12 and 13), respectively, which are carried out in the first embodiment described above. In view of this, these processes will not be described. The second embodiment differs from the first embodiment, in terms of the process of authenticating the user. The process of authenticating the user that the second embodiment performs will be explained in detail.

(3-1) System Configuration

Figure 14:
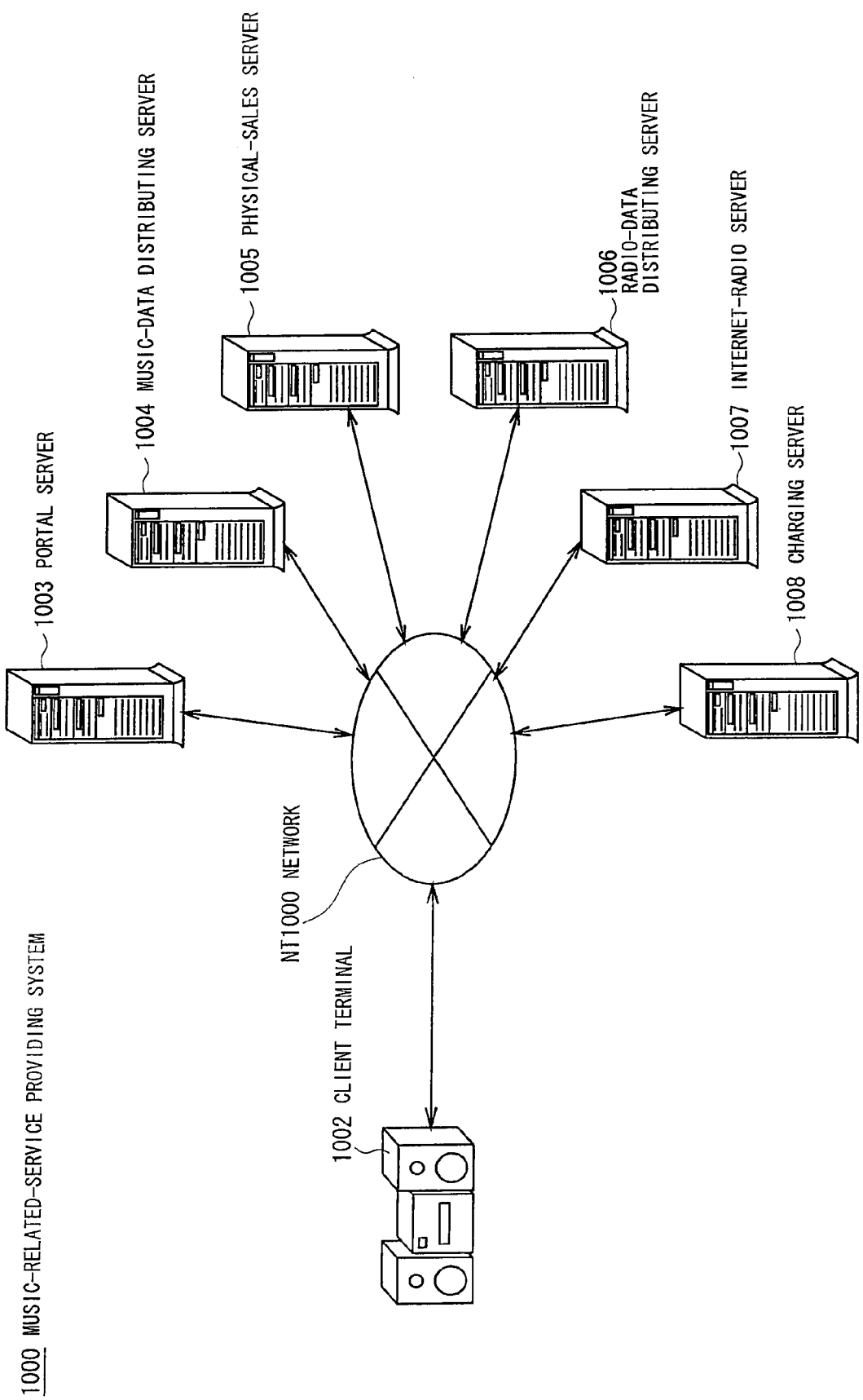
FIG. 14 is a diagram showing the over-all configuration of a service-providing system for distributing music data, which is a second embodiment of this invention.

FIG. 14 shows a service-providing system 1000 that offers service relating to music in the second embodiment. The service-providing system 1000 has a client terminal 1002, a portal server 1003, and a plurality of servers 1004 to 1008. The client terminal 1002 is possessed by a user who has entered contract with the provider who runs the service-providing system 1000. The portal server 1003 is an information-processing apparatus that is an external apparatus for managing the client terminal 1002. The servers 1004 to 1008 can provide the client terminal 1002 with various services.

In the second embodiment, the music-data distributing server 1004 distributes music data to the client terminal 1002. The music data is of ATRAC3 (Adaptive TRansform Acoustic Coding 3) type, ACC (Advanced Audio Coding) type, WMA (Window Media Audio) type, RealAUDIO G2 Music Codec type, MP3 (MPEG Audio Layer-3) type, or the like.

The physical-sales server 1005 provides sales service of selling CDs (Compact Discs), DVDs (Digital Versatile Discs), and the like to the user via the client terminal 1002.

The radio-data distributing server 1006 provides the service of distributing radio-broadcast information to the client terminal 1002. The radio-broadcast information is, for example, related to the radio programs, music and the like broadcast from radio stations.

The Internet-radio server 1007 provides an Internet-radio broadcasting service via the network NT1000. That is, the server 1007 distributes radio-broadcast information in the form of a data stream, to the client terminal 1002.

The charging server 1008 performs a process of charging fees for the various services that the user has received in accordance with a request from the portal server 103 or the like.

In the second embodiment, the client terminal 1002 is equivalent to the terminal apparatus 10 of the first embodiment. The portal server 1003 is equivalent to the integrated service server 35, and the music-data distributing server 1004 is equivalent to the music distributing server 33. The physical-sales server 1005 is equivalent to the CD-shop server 34, the radio-data distributing server 1006 is equivalent to the broadcast-station server 32, and the network NT1000 is equivalent to the network 30.

(3-2) Configuration of the Client Terminal 1002
(3-2-1) Function-Block Configuration of the Client Terminal 1002

Figure 15:
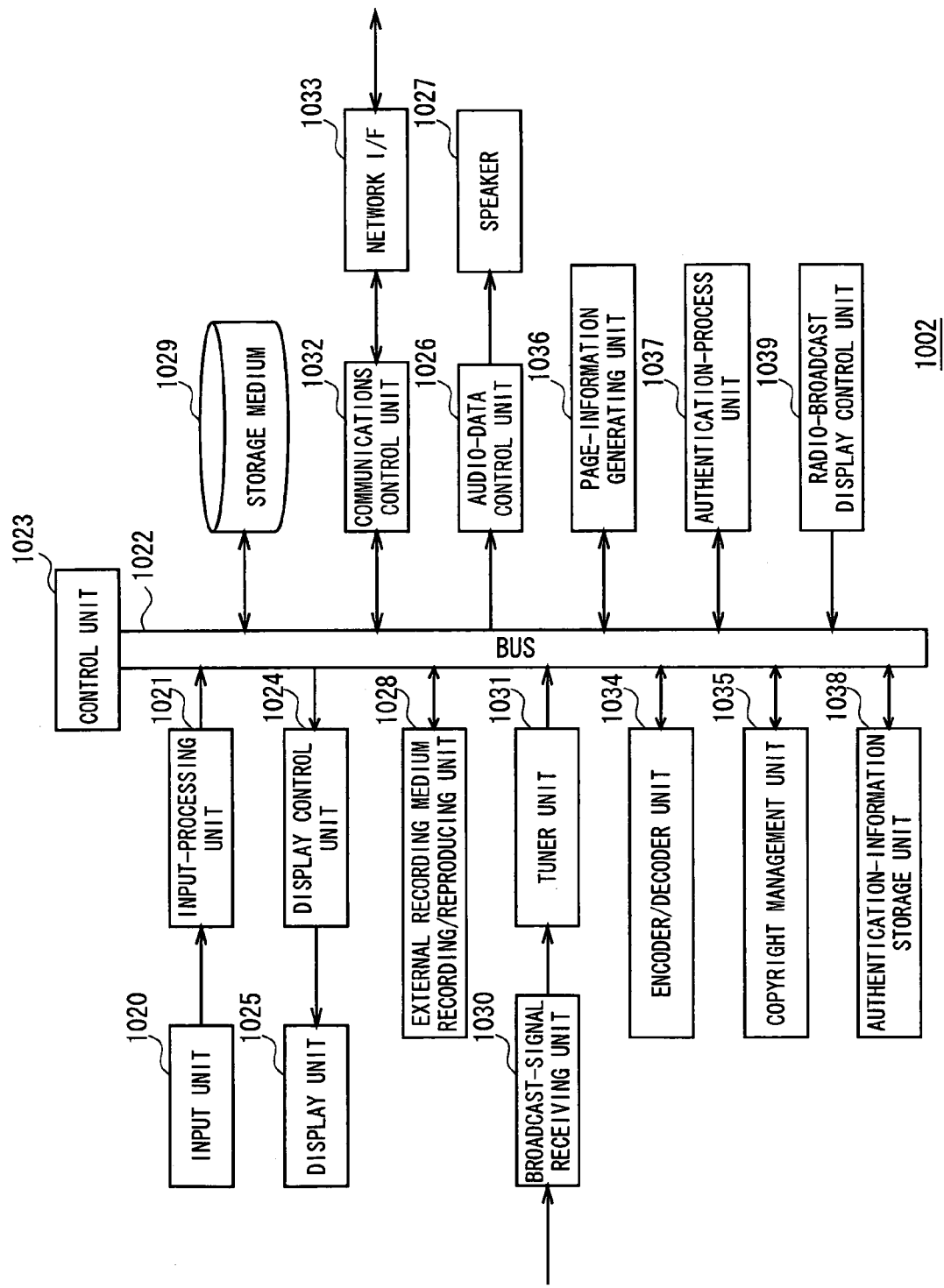
FIG. 15 is a block diagram of the hardware configuration of a client terminal, illustrating the function circuits of the terminal.
Figure 16:
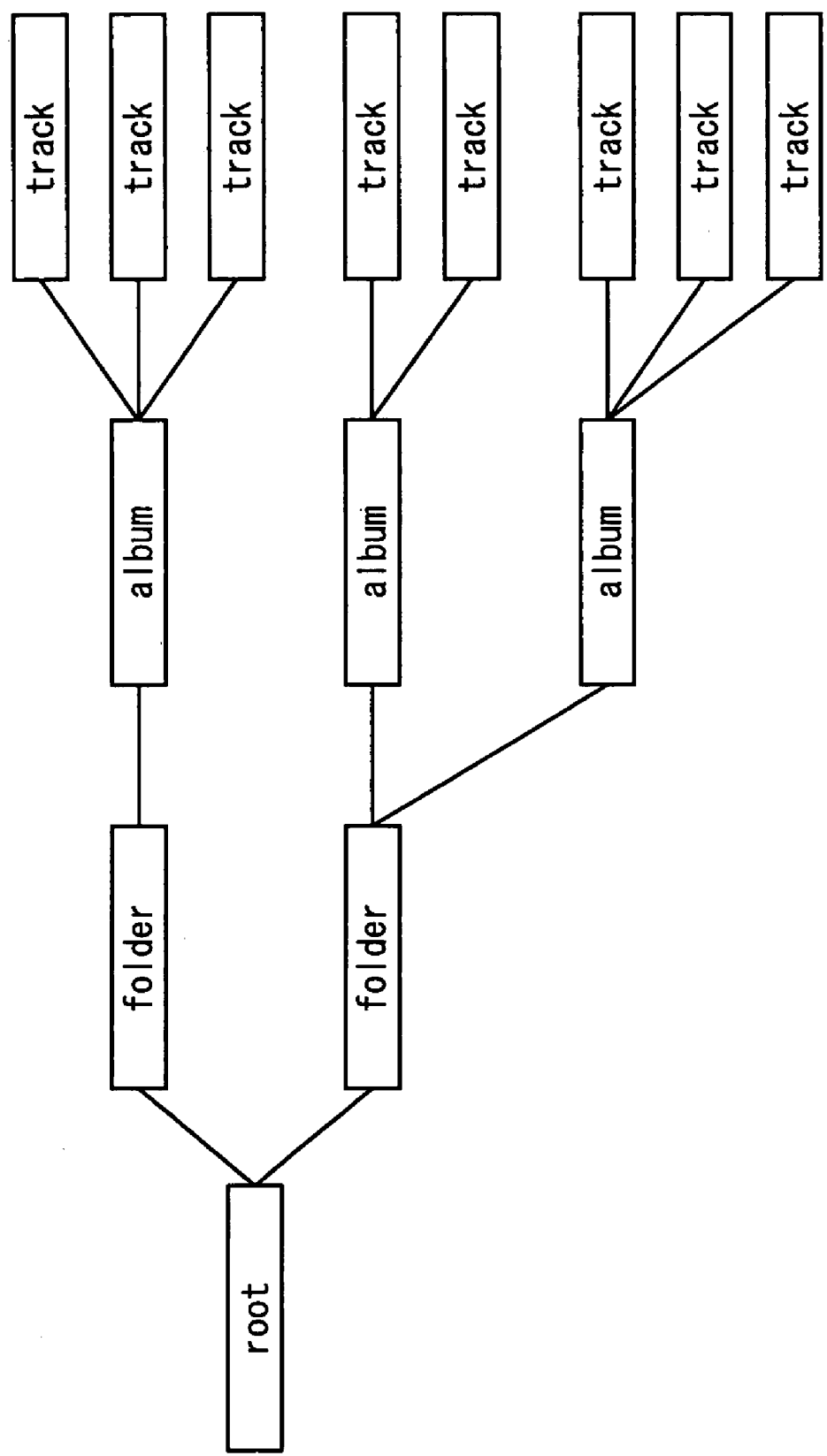
FIG. 16 is a diagram representing a directory configuration.

The hardware configuration of the client terminal 1002 will be described, with reference to a function-block diagram. As FIG. 15 shows, the client terminal 1002 determines that the user operates the input unit 1020 which is provided on a side of the housing of the terminal 1002, or on a remote controller (not shown) and which has various buttons. Then, the client terminal 1002 transmits an operation input signal according to the operation, to an input-processing unit 1021.

The input-processing unit 1021 converts the operation-input signals supplied from the input unit 1020 to operation commands. The operation commands are sent through a bus 1022 to a control unit 1023.

The control unit 1023 controls some of the other components of the client terminal 1002 in accordance with the operation commands and the control signals supplied from some other components of the client terminal 1002 via the bus 1022.

A display control unit 1024 performs analog-to-digital conversion on the video data supplied to it through the bus 1022, thus generating an analog video signal. The analog video signal is supplied to a display unit 1025.

The display unit 1025 is, for example, a display such as a liquid crystal display. It is provided on the housing of the client terminal 1002 or externally connected thereto.

The display unit 1025 receives the processing result generated by the control unit 1023 and various video data as the analog video signal via the display control unit 1024. The display unit 1025 displays images represented by the analog video signal.

An audio-data control unit 1026 receives the audio data supplied via the bus 1022 and converts it to an analog audio signal, which is supplied to a speaker 1027. The speaker 1027 generates sound from the analog audio signal supplied from the audio-data control unit 1026.

An external recording medium recording/reproducing unit 1028 is configured to reproduce content data from an external recording medium such as a CD, a memory stick (trademark), or the like and to record content data on the external recording medium. Note that a memory stick comprises a flash memory and a case containing the flash memory.

The recording/reproducing unit 1028 may read video data, as content data, from the external recording medium. In this case, the video data is supplied via the bus 1022 to the display control unit 1024.

The display control unit 1024 converts the video data (i.e., content data) read by the recording/reproducing unit 1028 from the external recording medium, to an analog video signal. The analog video signal is supplied to the display unit 1025.

The recording/reproducing unit 1028 may read audio data, as content data, from the external recording medium. If this is the case, the audio data is supplied via the bus 1022 to the audio-data control unit 1026.

The audio-data control unit 1026 converts the audio data (i.e., content data) read by the recording/reproducing unit 1028 from the external recording medium, to an analog audio signal. The analog audio signal is supplied to the speaker 1027.

The control unit 1023 causes the recording/reproducing unit 1028 to supply the content data read from the external recording medium, to the storage medium 1029 incorporated in the client terminal 1002. The content data is thereby stored in the storage medium 1029. (Hereinafter, this process of storing content data in the storage medium 1029 will be referred to as "clipping".)

The control unit 1023 may read video data (image data), as content data, from the storage medium 1029. In this event, the video data is supplied to the display control unit 1024 via the bus 1022.

The control unit 1023 may read audio data, as content data, from the storage medium 1029. In this event, the audio data is supplied to the audio-data control unit 1026 via the bus 1022.

In addition, the control unit 1023 can read music data from the storage medium 1029. The music data is transferred to the recording/reproducing unit 1028. Then, the recording/reproducing unit 1028 can record the music data on the external recording medium.

A broadcast-signal receiving unit 1030 receives radio waves transmitted from radio stations. The radio waves are supplied from the unit 1030 to a tuner unit 1031.

Controlled by the control unit 1023, the tuner unit 1031 extracts a radio broadcast signal from the radio waves received by the broadcast-signal receiving unit 1030, said signal having the frequency allocated to the radio station that the user has selected by operating the input unit 1020. The audio data obtained from the radio broadcast signal is supplied to the audio-data control unit 1026 through the bus 1022.

The audio-data control unit 1026 receives the audio data from the tuner unit 1031 and converts it to analog audio signal. The analog audio signal is sent to the speaker 1027. The speaker 1027 generates sound for the radio program broadcast from the radio station from the analog audio signal. The user can therefore listen to the radio program.

The control unit 1023 can supply the audio data obtained in the tuner unit 1031, to the storage medium 1029. Hence, the storage medium 1029 can store the audio data representing the radio program.

A control unit 1023 is connected to the network NT1000 first by a communications control unit 1032 and then by a network interface 1033. Thus, the control unit 1023 can access the portal server 1003 and other servers 1004 to 1007 that are provided on the network NT1000. The control unit 1023 can exchange various data items and data items with the portal server 1003 and the other servers 1004 to 1007.

The encoder/decoder unit 1034 receives the content data from the network NT1000 through the network interface 1033 and communications control unit 1032. The unit 1034 also receives the content data read from the storage medium 1029 or the external recording medium. The content data from the network NT100 and the content data from the storage medium 1029 or the external recording medium are encoded and compressed. The encoder/decoder unit 1034 decodes the content data and supplies them to the display control unit 1024 and the audio-data control unit 1026.

The content data read from the external recording medium may be one not compressed or encoded. In this case, the encoder/decoder unit 1034 compresses and encodes the content data. The encoder/decoder unit 1034 compresses and encodes the audio data and the like supplied from the tuner unit 1031, too. The content data, thus compressed and encoded, is sent to the storage medium 1029.

The content data compressed and encoded by the encoder/decoder unit 1034 is stored in the storage medium 1029 under the control of the control unit 1023.

A copyright management unit 1035 generates copyright management information about the content data downloaded from the network NT1000 via the network interface 1033 and communications control unit 1032. The unit 1035 also generates copyright management information about the content data the recording/reproducing unit 1028 has read from the external recording medium.

The control unit 1023 registers the copyright management information generated by the copyright management unit 1035, on the storage medium 1029. The copyright management information is registered, in association with the content data.

The copyright management unit 1035 may appropriately update the copyright management information to check out the content data associated with the copyright management information, between the storage medium 1029 and the external recording medium specified. Alternatively, the unit 1035 may appropriately update the copyright management information in order to check in the content data between the specified external recording medium and the storage medium 1029. In either case, the copy right to the content data is protected.

A page-information generating unit 1036 receives page information such as an XML (extensible Markup Language) file or an HTML (Hyper Text Markup Language) file from the network NT1000 via the network interface 1033 and communications control unit 1032. The unit 1036 interprets the page information and generates video data to be displayed by the display unit 1025. The video data is supplied to the display control unit 1024.

An authentication-process unit 1037 performs the process of transmitting authentication information to the portal server 1003 and the other servers 1004 to 1007 through the communications control unit 1032 and the network interface 1033. Note that the portal server 1003 and the other servers 1004 to 1007 are provided on the network NT1000 and are connected by the network interface 1033.

An authentication-information storage unit 1038 stores the authentication information that the authentication-process unit 1037 necessarily uses in order to access the portal server 1003 and the other servers 1004 to 1007.

A radio-broadcast display control unit 1039 transmits a request signal via the communications control unit 1032 and network interface 1033 to the radio-data distributing server 1006 of the radio station that is broadcasting the radio program the client terminal 1002 is receiving at present. The request signal requests that the server 1006 should give the user the information about the radio program that the client terminal 1002 is receiving.

As a result, the radio-broadcast display control unit 1039 receives the radio-broadcast information from the radio-broadcast-information distributing server 1006 on the network NT1000, first through a network interface 1033 and then through a communications control unit 1032. The control unit 1039 transmits the radio-broadcast information to a display control unit 1024. The display control unit 1024 causes a display unit 1025 to display the radio-broadcast information, which consists of the name of the radio program being received, the title of music being received, the name of the artist playing the music, and the like.

Of the program modules (FIG. 5) incorporated in the terminal apparatus 10 according to the first embodiment, the HTTP message program 111 and the communicator program 112 can perform functions that are similar to the those of the communications control unit 1032 (FIG. 15) provided in the client terminal 1002.

The content-playback module 113 (FIG. 5) is a program module that can perform a function similar to that of the encoder/decoder unit 1034 (FIG. 15) incorporated in the client terminal 1002.

The copyright protection information management module 114 (FIG. 5) is a program module that performs a function similar to that of the copyright management unit 1035 provided in the client terminal 1002.

The Internet-radio station selection/playback module 118 (FIG. 5) is a program module that can perform functions similar to those of the control unit 1023 and audio-data control unit 1026 (both shown in FIG. 15) that are incorporated in the client terminal 1002.

The music-purchase playback module 119 (FIG. 5) is a program module that can perform functions similar to those of the control unit 1023 and audio-data control unit 1026 (both shown in FIG. 15) incorporated in the client terminal 1002.

The XML browser 151 (FIG. 5) is a program module that can perform functions similar to those of the input-processing unit 1021 and page-information generating unit 1036 (both shown in FIG. 15) used in the client terminal 1002.

The hard-disc content controller 117, database accessing module 115 and content-data accessing module 116 (all shown in FIG. 5) are program modules that can perform functions similar to that of the control unit 1023 (FIG. 15) incorporated in the client terminal 1002.

The authentication library 131 (FIG. 5) of the library 130 is a program module that can perform a function similar to those of the authentication-process unit 1037 and authentication-information storage unit 1038 (both shown in FIG. 15) used in the client terminal 1002.

The clip library 132 (FIG. 5) provided in the library 130 is a program module that can perform a function similar to that of the control unit 1023 (FIG. 15) provided in the client terminal 1002.

The related-information displaying module 120 (FIG. 5) is a program module that can perform a function similar to that of the radio-broadcast display control unit 1039 (FIG. 15) incorporated in the client terminal 1002.

The tuner-station reproducing/recording module 121 is a program module that can perform functions similar to those of the control unit 1023, audio-data control unit 1026 and tuner unit 1031 (all shown in FIG. 15) provided in the client terminal 1002.

The audio-user interface 152 (FIG. 5) is a program module that can perform functions similar to those of the input-processing unit 1021, control unit 1023 and display control unit 1024 (all shown in FIG. 15) provided in the client terminal 1002.

The CD-playback module 141 (FIG. 5) is a program module that can perform functions similar to those of the audio-data control unit 1026 and external recording medium recording/reproducing unit 1028 (both shown in FIG. 15) provided in the client terminal 1002.

The HDD-playback module 142 (FIG. 5) is a program module that can perform functions similar to those of the control unit 1023 and audio-data control unit 1026 (both shown in FIG. 15) provided in the client terminal 1002.

Hence, in the terminal apparatus 10 of the hardware configuration according to the first embodiment, the CPU 11 can perform the same processes as the client terminal 1002 of function circuit block according to the second embodiment, by using the various program modules specified above.

(3-2-2) Directory Management

In the client terminal 1002, the control unit 1023 controls the content data to be stored in the storage medium 1029, in the form of such a directory configuration as is illustrated in FIG. 11. A given number of "folder" directories are prepared, constituting a layer immediately lower than "root" directories. The "folder" directories thus prepared correspond to the genres of contents or the users who may own the client terminal 1002.

"Album" directories are prepared, forming a layer immediately lower than "folder" directories. They are provided in numbers falling within a prescribed range. The "album" directories correspond to, for example, each album title. At least one "track" files are prepared, constituting a layer immediately lower than "album" directories. Several track files may belong to each album directory. Each track file is one musical piece, i.e., contents.

The content data of this directory configuration is managed by the database file that is stored in the storage medium 1029.

(3-3) Configuration of the Portal Server 1003

Figure 17:
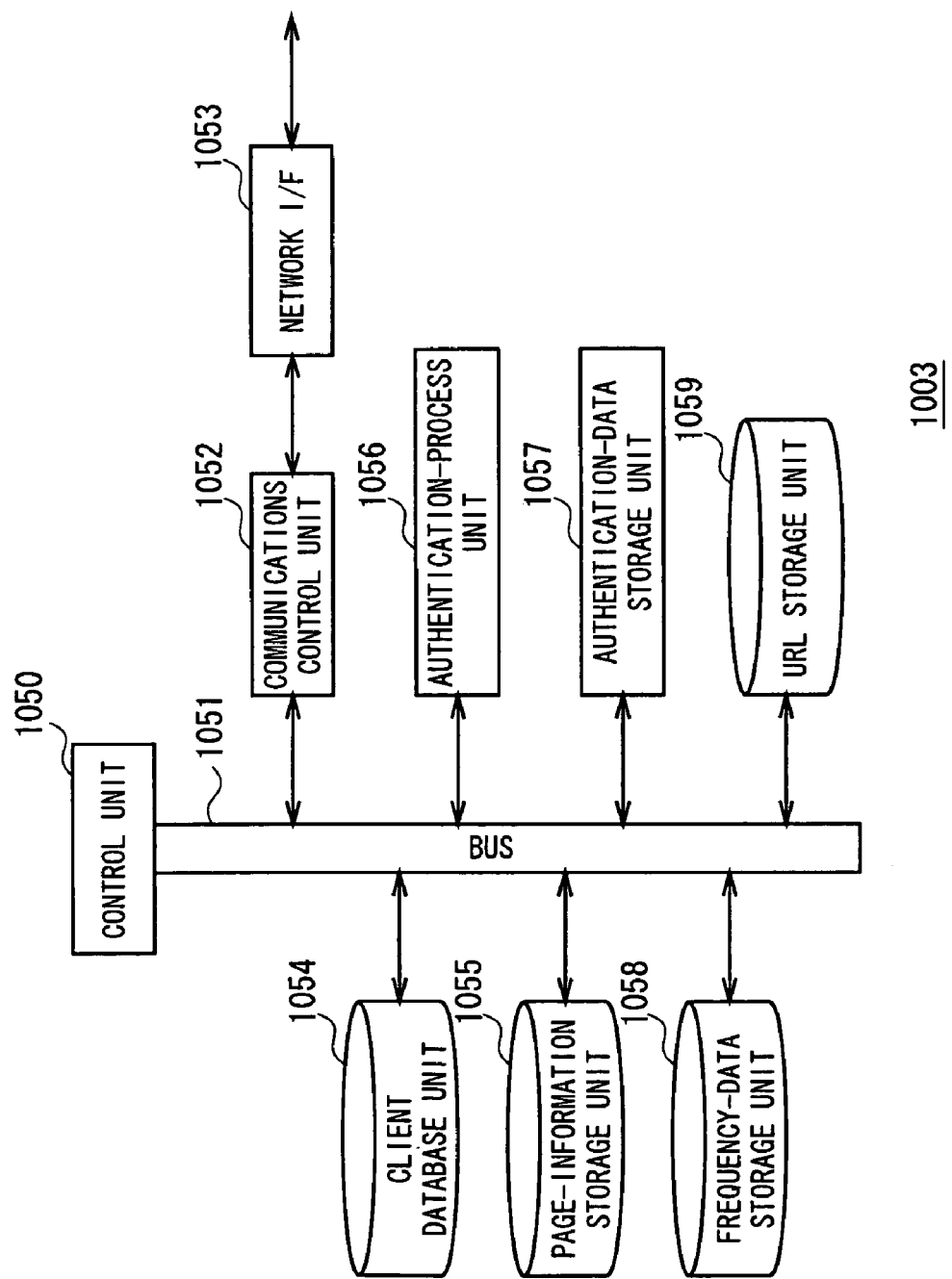
FIG. 17 is a block diagram of the hardware configuration of a portal server, depicting the function circuits constituting this server.

The hardware configuration of the portal server 1003, which functions, will be described with reference to FIG. 17. The portal server 1003 incorporates a control unit 1050 and a bus 1051. The control unit 1050 controls the other components of the portal server 1003, which are connected to the unit 1050 by the bus 1051.

Controlled by the control unit 1050, a communications control unit 1052 receives various data items from, and transmits various data items to, the client terminal 1002 and the other servers 1004 to 1008 through a network interface 1053.

A client database unit 1054 contains the ID (Identification) code and password of any user who has entered contract with the provider that runs the service-providing system 1000 that offers service relating to music. The ID code and the password are registered, one associated with the other, forming an item of client information.

The client database unit 1054 contains user-set information about any user, in addition to the ID (Identification) code and the password. The user-set information represents, for example, the postal code, address, phone number and the like of the user.

A page-information storage unit 1055 storage unit 1055 stores page information and the like, which are managed by the provider that runs the service-providing system 1000 that offers service relating to music.

The page information is described in a specific language such as an XML. It contains URL (Uniform Resource Locator) information the portal server 1003 uses to access the music-data distributing server 1004, physical-sales server 1005, radio-data distributing server 1006, Internet-radio server 1007, etc.

An authentication-process unit 1056 can receive the user ID code and the user password from the client terminal 1002 through the network interface 1053 and communications control unit 1052. Upon receiving the user ID code and the user password, the unit 1056 determines whether the ID code and the password are registered as client information in the client database unit 1054.

Upon finishing the process of authenticating the user, the authentication-process unit 1056 issues portal-authentication result data (i.e., authentication-cession ID data, later described). The portal-authentication result data, which indicates the result of the process of authenticating the user, is temporarily stored in an authentication-information storage unit 1057.

As the result of the process of authenticating the user, the authentication-process unit 1056 may determine that the user is an authenticated one. In this case, the control unit 1050 reads the page information for a contracting part, from the page-information storage unit 1055. The control unit 1050 transmits the page information, together with the portal-authentication result data, to the client terminal 1002, first through the communications control unit 1052 and then through the network interface 1053.

As the result of the process of authenticating the user, the authentication-process unit 1056 may determine that the user is not an authenticated one. In this case, the control unit 1050 reads authentication-error notifying page information from the page-information storage unit 1055. The control unit 1050 transmits authentication-error information, together with the authentication-error-notifying page information, to the client terminal 1002, first through the communications control unit 1052 and then through the network interface 1053. The authentication-error-notifying page information indicates that the user is not an authenticated one.

Portal-authentication result data (i.e., authentication ticket, later described) is transmitted from the client terminal 1002 when the music-data distributing server 1004, physical-sales server 1005 and radio-data distributing server 1006 finish the authentication process on the user of the client terminal 1002. The authentication-process unit 1056 receives the portal-authentication result data via the network interface 1053 and communications control unit 1052. The unit 1056 then compares this portal-authentication result data with the portal-authentication result data temporarily stored in the authentication-information storage unit 1057.

The authentication-process unit 1056 determines whether portal-authentication result data from the music-data distributing server 1004, physical-sales server 1005 and radio-data distributing server 1006 is normal one or not. The result of this decision is sent to the music-data distributing server 1004, physical-sales server 1005 and radio-data distributing server 1006, first through the communications control unit 1052 and then through the network interface 1053.

A frequency-data storage unit 1058 stores broadcast station information. The broadcast station information contains area code, frequency data items, names of radio stations, and call signs, each stored in association with any other data item. The area codes are, for example, postal codes assigned to the areas, respectively. The frequency data items represent the frequencies assigned to the radio stations from which the client terminal 1002 can receive signals. The names of radio stations (hereinafter referred to as "radio-station names") pertain to the stations that broadcast radio programs that the terminal 1002 can receive. The call signs are ID data items that are uniquely assigned to the radio stations, respectively.

The URL storage unit 1059 stores the call signs for each radio station and URL data items associated with the call signs, respectively. The URL data items represent URLs that can acquire the radio-broadcast data items (hereinafter called "now-on-air data items") about the radio programs that the radio stations are broadcasting at present. Each now-on-air data item is the name of a radio program being broadcast, the title of the musical piece being broadcast, and the like.

In the first embodiment described above, the CPU 10*a* of the integrated service server 10 (FIG. 3) carries out various processes, basically in accordance with the programs stored in the HDD 10*c*.

Hence, the CPU 10*a* can function in the same way as the control unit 1050, communications control unit 1052 and authentication-process unit 1056 of the portal server 1003, only if an appropriate program is selected from the various programs stored in the HDD 10*c*, in accordance with that function of the portal server 1003. Note that the function of the portal server 1003 is specified in FIG. 12 that shows the hardware configuration of the portal server 1003. Further, the HDD 10*c* can be used in the same way as the client database unit 1054, page-information storage unit 1055, authentication-information storage unit 1057, frequency-data storage unit 1058 and URL storage unit 1059 of the portal server 1003.

(3-4) Configuration of the Music-Data Distributing Server 1004

Figure 18:
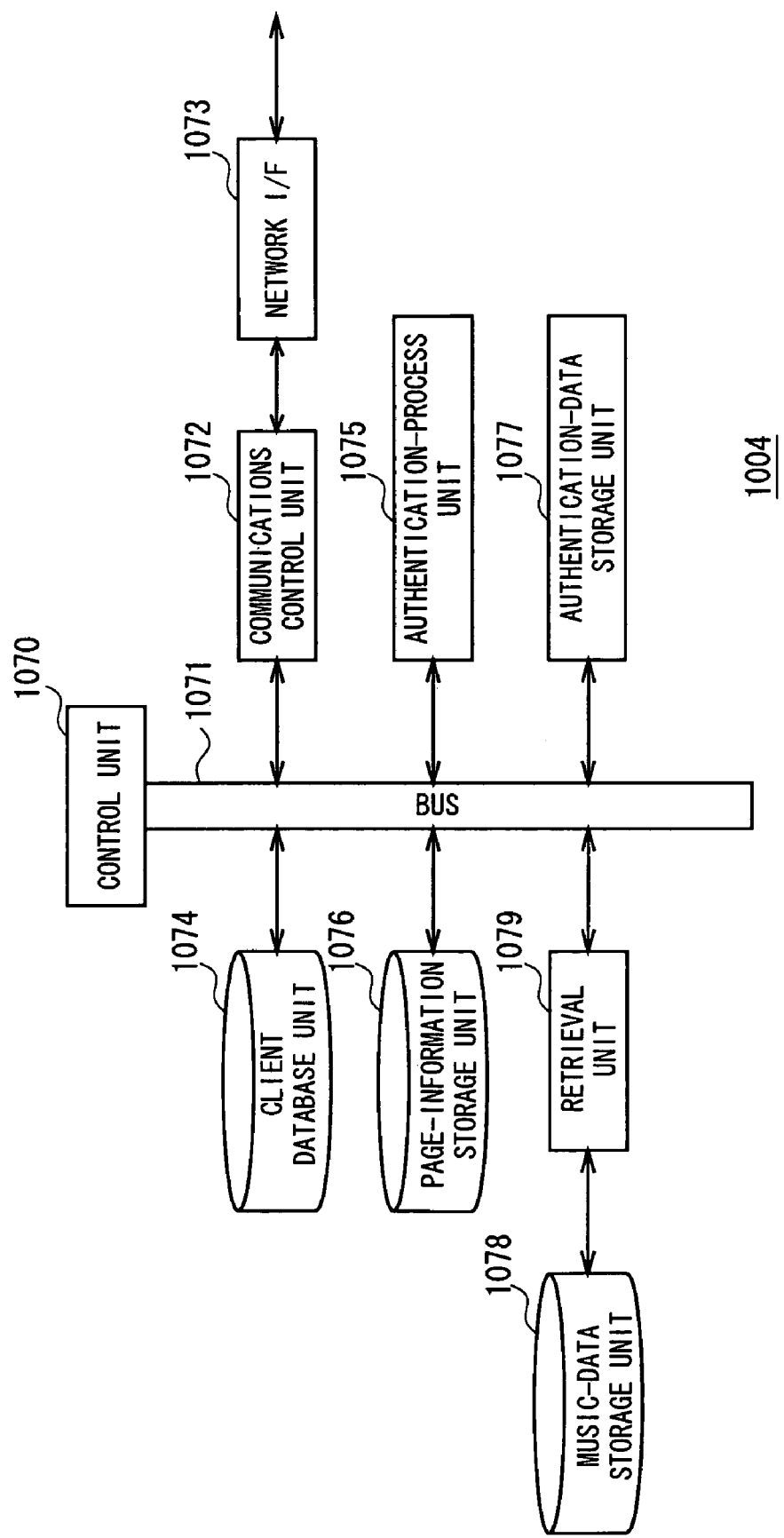
FIG. 18 is a block diagram of the hardware configuration of a music-data distributing server, showing the function circuits constituting this server.

The hardware configuration of the music-data distributing server 1004 will be described, with reference to FIG. 18. The server 1004 incorporates a control unit 1070 and a bus 1071. The control unit 1070 controls the other components of the server 1004 connected to it by the bus 1071.

Controlled by the control unit 1070, a communications control unit 1072 receives various data items or various data items from, and transmits various data items to, the client terminal 1002, the portal server 1003 and the like through a network interface 1073. The various data items are, for example, content data.

A client database unit 1074 contains the user ID code and password of any user who has entered contract with the provider that runs the music-data distributing server 1004. The user ID code and the password are registered, one associated with the other, forming an item of client information. The client database 1074 need not be used if an authentication-process unit 1075 can authenticate the user on the basis of the portal-authentication result data that has transmitted from the client terminal 1002 and that the portal server 1003 has issued.

A page-information storage unit 1076 stores page information and the like, which are managed in the music-data distributing server 1004. This page information introduces the music data items that can be downloaded.

The page information for use in distributing music data items is described in a specific language such as an XML. The page information helps the user of the client terminal 1002 to select any music data items that he or she wants to have downloaded.

The control unit 1070 may receive a request signal from the client terminal 1002 via the network interface 1073 and the communications control unit 1072. The request signal requests for the page information for distributing music data, which should be transmitted to the client terminal 1002. Upon receiving the request signal, the control unit 1070 supplies the page information for distributing the music data, which is stored in the page-information storage unit 1076, to the client terminal 1002 through the communications control unit 1072 and a network interface 1073.

The authentication-process unit 1075 receives the user ID code and password of the user from the client terminal 1002, first through the network interface 1073 and then through the communications control unit 1072. Then, it is determined whether the user ID code and the password have been registered, as client information, in the client database unit 1074. Thus, the authentication-process unit 1075 authenticates the user of the client terminal 1002.

The authentication-process unit 1075 may authenticate the user by a different method that uses neither the user ID code nor the user password. That is, the unit 1075 receives portal-authentication result data (i.e., authentication ticket, later described) issued by the portal server 1003 and transmitted from the client terminal 1002, first through the network interface 1073 and then through the communications control unit 1072. The authentication-process unit 1075 then transmits the portal-authentication result data to the portal server 1003, first through the communications control unit 1072 and then through the network interface 1073.

The portal server 1003 receives the portal-authentication result data and confirms the receipt of this data. The server 1003 transmits the data indicating the receipt of the portal-authentication result data. The authentication-process unit 1075 receives this data from the portal server 1003, first through the network interface 1073 and then through the communications control unit 1072. From this data, the authentication-process unit 1075 determines whether the user is an authenticated user who has entered a contract with the provider that runs the service-providing system 1000 in order to receive the service relating to music.

Thus, the authentication-process unit 1075 issues server-authentication result data (i.e., service-cession ID data, later described) that shows the result of the authentication of the user.

The authentication-process unit 1075 may thus determine that the user is an authenticated one, as it finishes the process of authenticating the user. If this is the case, the control unit 1070 supplies the page information to the client terminal 1002, together with the server-authentication result data, through the communications control unit 1072 and the network interface 1073. The page information, which will be used to distribute the music data, is stored in the page-information storage unit 1076.

Conversely, the authentication-process unit 1075 may not determine that the user is an authenticated one, as it finishes the process of authenticating the user. In this case, the control unit 1070 supplies an authentication-error information to the client terminal 1002, together with the page information, through the communications control unit 1072 and the network interface 1073. The page information, which indicates the authentication failure, is stored in the page-information storage unit 1076.

An authentication-information storage unit 1077 temporarily stores the server-authentication result data issued by the authentication-process unit 1075. The storage unit 1077 stores various authentication data items, too. The authentication-process unit 1075 must use these authentication data items to authenticate the user of the client terminal 1002.

A music-data storage unit 1078 stores a plurality of music data items that have been compressed and encoded in the above-mentioned ATRAC3 format or the above-mentioned MP3 format. In the unit 1078, the music data items are recorded, each associated with a retrieval key such as a content ID code.

A retrieval unit 1079 can receive a download request signal from the client terminal 1002 through the network interface 1073 and the communications control unit 1072. Note that the client terminal 1002 transmits the download request signal when it receives the page information for distributing music data items. The download request signal requests that any music data item that the user wants should be downloaded into the client terminal 1002. This signal contains a key for retrieving the music data. Upon receiving the download request signal, the retrieval unit 1079 extracts the retrieval key from the download request signal.

In accordance with the retrieval key, the retrieval unit 1079 retrieves the music data item the user wants to have downloaded, from the music-data storage unit 1078.

The control unit 1070 transmits the music data item thus retrieved, to the client terminal 1002, first through the communications control unit 1072 and then through the network interface 1073.

The control unit 1070 transmits charge information to the charging server 1008, first through the communications control unit 1072 and then through the network interface 1073. The charge information will be used to collect from the user the charge for downloading the music data item. On the basis of the charge information, the charging server 1008 performs the process of charging the user for the music data item downloaded by the user.

(3-5) Configuration of the Physical-Sales Server 1005

Figure 19:
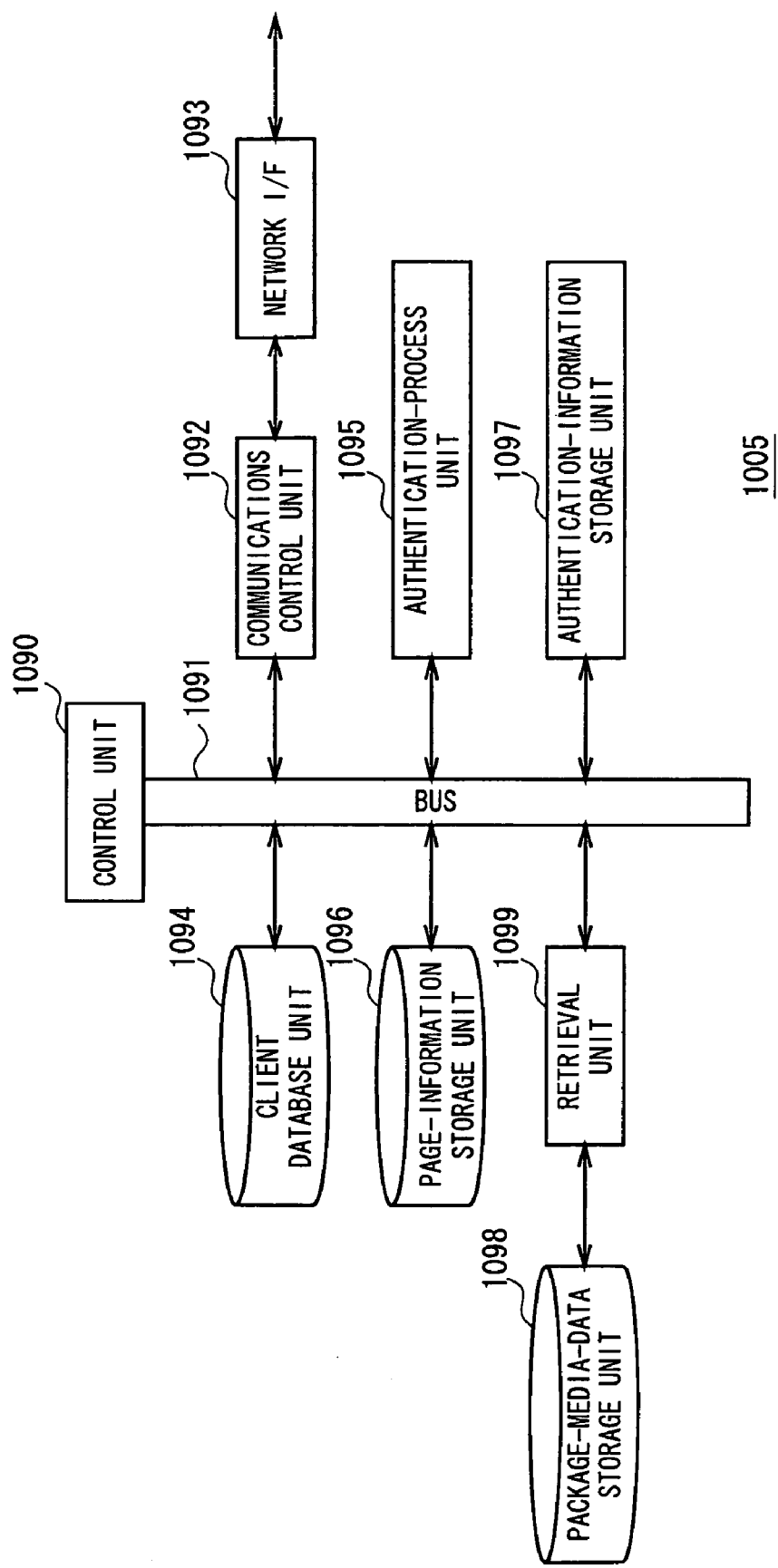
FIG. 19 is a block diagram of the hardware configuration of a sales server, showing the function circuits constituting the sales server.

The hardware configuration of the physical-sales server 1005 will be described, with reference to FIG. 19. The physical-sales server 1005 incorporates a control unit 1090 and a bus 1091. The control unit 1090 controls the other components of the physical-sales server 1005, which are connected to it by the bus 1091.

When controlled by the control unit 1090, a communications control unit 1092 receives various data items from, and transmits various data items to, the client terminal 1002, the portal server 1003 and the like through a network interface 1093.

A client database unit 1094 stores the user ID codes and passwords of the users who have already entered a contract with the provider that runs the physical-sales server 1005. The user ID codes and the user passwords are registered in one-to-one association, in the client database unit 1094. An authentication-process unit 1095 may have the function of authenticate the user of the client terminal 1002 in accordance with the portal-authentication result data issued by the portal server 1003 and transmitted from the client terminal 1002. In this case, the client database unit 1094 need not be provided.

A page-information storage unit 1096 stores page information and the like. The page information is used for the sale of package media such as CDs and DVDs for sale. More precisely, the page information introduces the package media.

The page information for promoting the sale of the package media is described in a specific language such as an XML. The page information helps the user of the client terminal 1002 to select any package media (e.g., CDs or DVDs) that he or she wants to buy.

The control unit 1090 can receive a page-information acquisition request signal from the client terminal 1002, which requests for the page information for the sale of package media. Upon receipt of the page-information acquisition request signal, first through the network interface 1093 and then through the communications control unit 1092, the control unit 1090 transmits the page information for the sale of package media to the client terminal 1002, first through the communications control unit 1092 and then through the network interface 1093. It should be recalled that the page information is stored in the page-information storage unit 1096.

The authentication-process unit 1095 receives the user IC code and the password, both assigned to the user of the client terminal 1002, from the client terminal 1002 through the network interface 1093 and the communications control unit 1092. The unit 1095 then determines whether the user ID code and the user password are registered as client information in the client database unit 1094, in order to authenticate the user.

The authentication-process unit 1095 may authenticate the user by a different method that uses neither the user ID code nor the user password. In this method, the unit 1095 receives the portal-authentication result data (i.e., authentication ticket, later described) issued by the portal server 1003 and transmitted from the client terminal 1002, first through the network interface 1093 and then through the communications control unit 1092. The portal-authentication result data, thus received, is transmitted to the portal server 1003, first through the communications control unit 1092 and then through the network interface 1093.

When the portal-authentication result data is transmitted to the portal server 1003, the authentication-process unit 1095 receives confirmation result data from the portal server 1003 through the network interface 1093 and the communications control unit 1092. The confirmation result data shows that the portal server 1003 has performed an authentication process (i.e., the confirmation process described above) on the basis of the portal-authentication result data. Then, the authentication-process unit 1095 determines, from the confirmation result data, whether the user of the client terminal 1002 is an authenticated one who has entered a contract with the provider that runs the service-providing system 1000 that offers service relating a music.

When the authentication-process unit 1095 finishes the process of authenticating the user, it generates server-authentication result data (i.e., service-cession ID data, later described) that indicates the result of the process of authenticating the user.

If the authentication-process unit 1095 authenticates the user as the result of the process of user authentication, the control unit 1090 transmits the page information, together with the server-authentication result data, to the client terminal 1002, first through the communications control unit 1092 and then through the network interface 1093. Note that the page information is stored in the page-information storage unit 1096 and is used to promote the sale of package media.

The authentication-process unit 1095 may not authenticate the user, as the result of the process of user authentication. If this is the case, the control unit 1090 transmits authentication-error information, together with authentication-error-notifying page information, to the client terminal 1002, first through the communications control unit 1092 and then through the network interface 1093. The authentication-error-notifying page information, which indicates the authentication failure, is stored in the page-information storage unit 1096.

An authentication-information storage unit 1097 temporarily stores the server-authentication result data issued by the authentication-process unit 1095. The storage unit 1097 stores various authentication data items, too. The authentication-process unit 1095 must use these authentication data items to authenticate the user of the client terminal 1002.

The package-media-data storage unit 1098 stores data items about a plurality of package media such as CDs and DVDs for sale. (Hereinafter, these data items will be referred to as "package-media data items.") In the unit 1098, the package-media data items are recorded, each associated with a retrieval key such as package-medium ID code.

The retrieval unit 1099 can receive a media-data request signal from the client terminal 1002 through the network interface 1093 and the communications control unit 1092. Note that the client terminal 1002 transmits the media-data request signal when it receives the page information for the sale of package media. The media-data request signal requests for the package media information about the specific package medium such as CD or DVD. Upon receiving the media-data request signal, the retrieval unit 1099 extracts the retrieval key for retrieving the specific package media.

On the basis of the retrieval key, the retrieval unit 1099 retrieves the package-media data item about the specific package medium that corresponds to the retrieval condition designated by the retrieval key from a plurality of package-media data items in the package-media-data storage unit 1098.

The control unit 1090 transmits the package-media data item thus retrieved, to the client terminal 1002, first through the communications control unit 1092 and then through the network interface 1093. The client terminal 1002 displays the package-media data item about the specific package medium.

The control unit 1090 may receive a purchase request signal from the client terminal 1002, through the network interface 1093 and the communications control unit 1092. Note that the purchase request signal indicates that the user wants to buy the specific package medium. Upon receiving the purchase request signal, the control unit 1090 performs the process of buying and delivering the package medium specified by the user of the client terminal 1002.

The control unit 1090 transmits charge information to the charging server 1008, first through the communications control unit 1092 and then through the network interface 1093. The charge information will be used to collect from the user the money for package medium. On the basis of the charge information, the charging server 1008 performs the process of charging the user for the specific package medium.

Upon finishing the process of causing the charging server 1008 to charge the user, the control unit 1090 transmits purchase-completion page information to the client terminal 1002, first through the communications control unit 1092 and then through the network interface 1093. The purchase-completion page information shows that the user has bought the package medium.

(3-6) Configuration of the Radio-Data Distributing Server 1006

Figure 20:
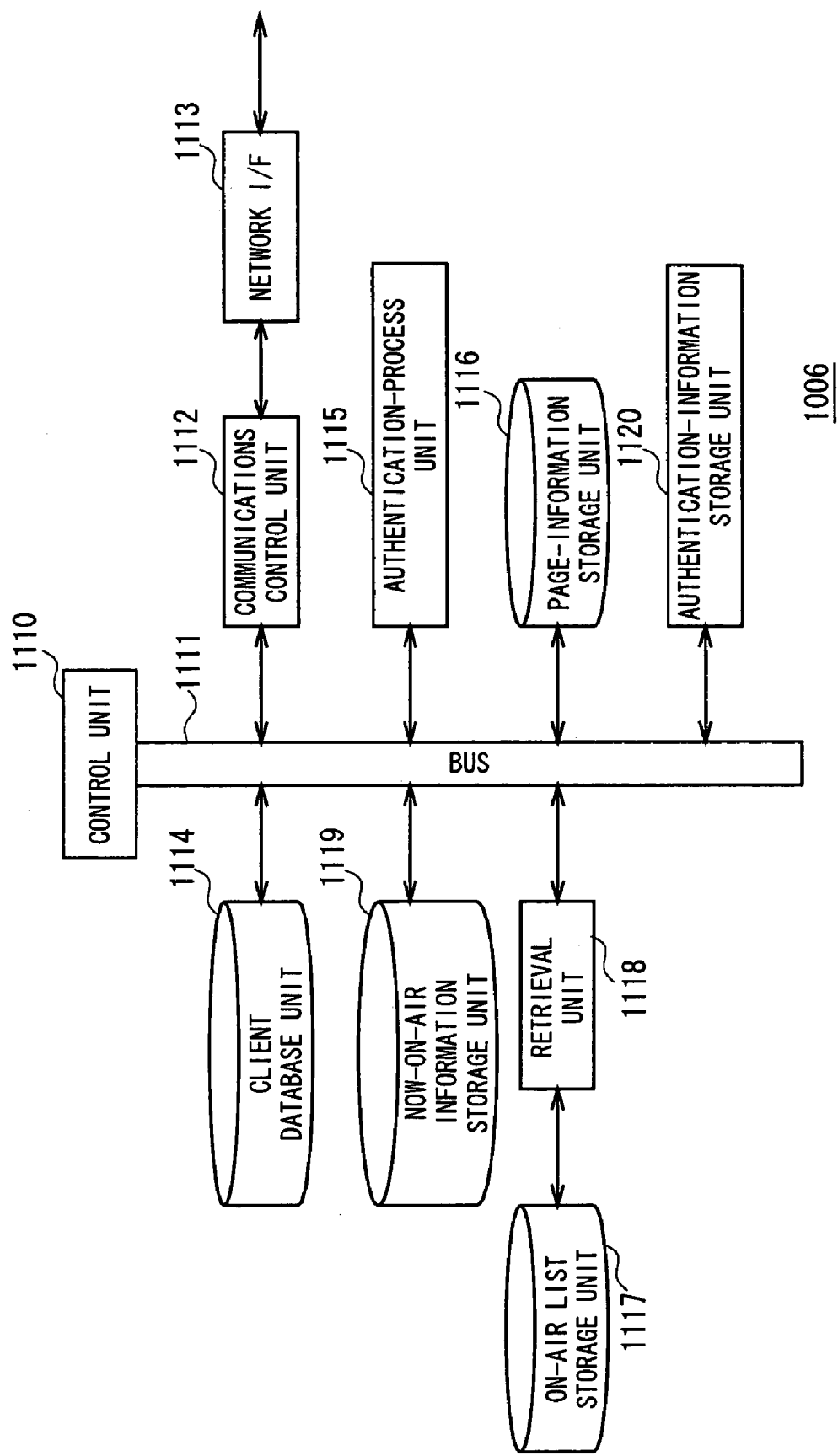
FIG. 20 is a block diagram of the hardware configuration of a radio broadcasting information server, showing the function circuits constituting this server.

The radio-data distributing server 1006 that operates as server for providing related information will be described, with reference to FIG. 20. The radio-data distributing server 1006 incorporates a control unit 1110 and a bus 1111. The control unit 1110 controls the other components of the radio-data distributing server 1006, which are connected to it by the bus 1111.

Controlled by the control unit 1110, a communications control unit 1112 receives various data items from, and transmits various data items to, the client terminal 1002, the portal server 1003 and the like through a network interface 1113.

A client database unit 1114 stores client information. The client information contains the user ID (Identification) code and password of any user who has entered contract with the provider that runs the radio-data distributing server 1006. The user ID code and the password are registered, one associated with the other, forming an item of client information. The client database unit 1114 need not be used if an authentication-process unit 1115 can authenticate the user on the basis of the portal-authentication result data that has transmitted from the client terminal 1002 and that the portal server 1003 has issued.

A page information storage unit 1116 stores page information and the like, which will be used to acquire radio broadcast information (hereinafter called "on-air list information"). The on-air list information is managed by the radio-data distributing server 1006 and concerns with the radio programs that have been broadcast by the radio stations that are linked to the radio-data distributing server 1006.

The page-information for distributing the on-air list information is described in a specific language such as an XML. It contains an input box or the like. The input box is used to input the name and broadcast date of any radio program that the user wishes to have, which will be used as a key for retrieving the on-air list information.

An on-air list storage unit 1117 stores the name, on-air start time and on-air end time of each radio program that any radio station linked to the radio-data distributing server 1006 has already broadcast. The unit 1117 stores on-air list information, too. The on-air list information represents a list of the titles of the musical pieces broadcast in the radio program, the names of the artists who play the musical pieces, the on-air start time of each of these musical pieces, and the like.

The control unit 1110 receives a page-information acquisition request signal requesting the page information for distributing the on-air list information, from the client terminal 1002, first through the network interface 1113 and then through the communications control unit 1112. In response to the page-information acquisition request signal, the control unit 1110 transmits the page information for distributing the on-air list information, to the client-terminal 1002, first through the communications control unit 1112 and then through the network interface 1113. Note that this page information is stored in the page-information storage unit 1116.

A retrieval unit 1118 can receive an on-air list information request signal from the client terminal 1002 through the network interface 1113 and the communications control unit 1112. Note that the on-air list information request signal contains a key for retrieving the desired on-air list information input on the page information for distributing the on-air list information. Upon receiving the on-air list information request signal, the retrieval unit 1118 extracts the retrieval key from the on-air list information request signal.

In accordance with the retrieval key, the retrieval unit 1118 retrieves, from the on-air list storage unit 1117, that part of the on-air list information which meets the retrieval condition defined by the retrieval key. This part of the on-air list information, thus extracted, is the on-air list information desired.

The control unit 1110 transmits the on-air list information thus retrieved, to the client terminal 1002, first through the communications control unit 1112 and then through the network interface 1113.

A now-on-air information storage unit 1119 stores the now-on-air information that represents the name, on-air start time and on-air end time of the radio program being broadcast from the radio station linked to the radio-data distributing server 1006. The now-on-air list information represents the titles of the musical pieces, the names of the artists who play the musical pieces, the on-air start time of each of these musical pieces being broadcast, and the like, too.

The authentication-process unit 1115 receives the user ID code and password of the user of the client terminal 1002, along with the now-on-air information request signal, from the client terminal 1002 through the network interface 1113 and the communications control unit 1112. Upon receiving the user ID code and password of the user, the unit 1115 determines whether the user ID code and user password have been registered as client information in the client database unit 1114, in order to authenticate the user.

The authentication-process unit 1115 may authenticate the user by a different method that uses neither the user ID code nor the user password. In this method, the unit 1115 receives the portal-authentication result data (i.e., authentication ticket, later described) issued by the portal server 1003 and transmitted from the client terminal 1002, first through the network interface 1113 and then through the communications control unit 1112. The portal-authentication result data, thus received, is transmitted to the portal server 1003, first through the communications control unit 1112 and then through the network interface 1113.

When the portal-authentication result data is transmitted to the portal server 1003, the authentication-process unit 1115 receives confirmation result data from the portal server 1003 through the network interface 1113 and the communications control unit 1112. The confirmation result data shows that the portal server 1003 has performed an authentication process (i.e., the confirmation process described above) on the basis of the portal-authentication result data. Then, the authentication-process unit 1115 determines, from the confirmation result data, whether the user is an authenticated one who has entered a contract with the provider that runs the service-providing system 1000 that offers service relating to music.

When the authentication-process unit 1115 finishes the process of authenticating the user, it generates server-authentication result data (i.e., service-cession ID data, later described) that indicates the result of the process of authenticating the user.

If the authentication-process unit 1115 authenticates the user as the result of the process of user authentication, the control unit 1110 transmits the now-on-air information, together with the server-authentication result data, to the client terminal 1002, first through the communications control unit 1112 and then through the network interface 1113. Note that the now-on-air information is stored in the now-on-air data storage unit 1119.

The authentication-process unit 1115 may not authenticate the user, as the result of the process of user authentication. If this is the case, the control unit 1110 transmits authentication-error information, together with authentication-error-notifying page information, which indicates the authentication failure, to the client terminal 1002, first through the communications control unit 1112 and then through the network interface 1113.

Thus, the control unit 1110 distributes the now-on-air information at the request of the user if the user is authenticated. If the user cannot be authenticated, the control unit 1110 disables the user from receiving the radio broadcast information distribution service, such as the now-on-air information, which the radio-data distributing server 1006 provides.

An authentication-information storage unit 1120 temporarily stores the server-authentication result data issued by the authentication-process unit 1115. The unit 1120 stores various authentication data items, too. The authentication-process unit 1115 must use these authentication data items to authenticate the user of the client terminal 1002.

(3-7) Processes Performed by the Servers
(3-7-1) Sequence of the User Authentication between the Client Terminal 1002 and the Portal Server 1003

Figure 21:
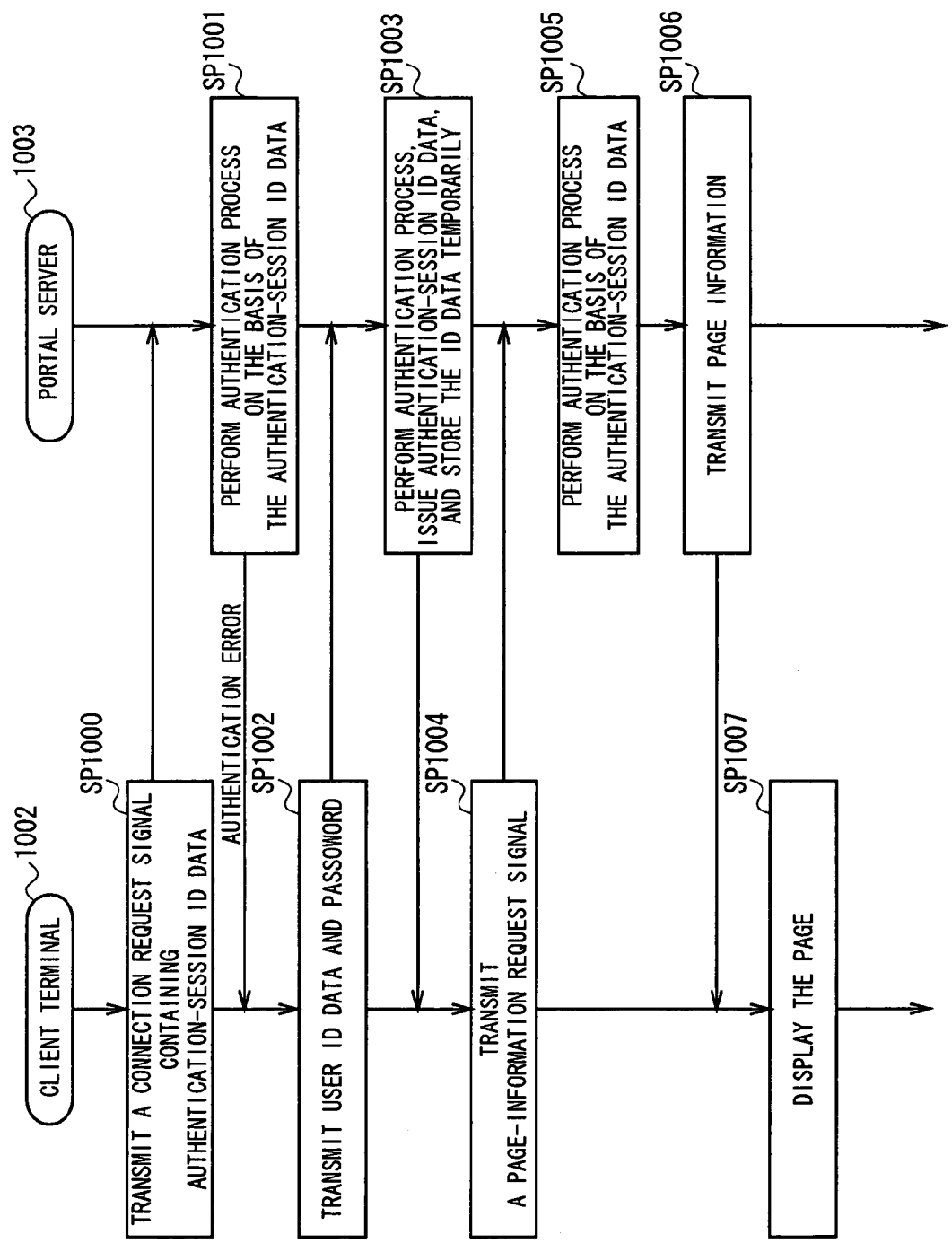
FIG. 21 is a sequence chart illustrating the sequence of authenticating the user, which is achieved between the client terminal and the portal server.

The process of authenticating the user, which is achieved between the client terminal 1002 and the portal server 1003 will be explained, with reference to FIG. 21.

Assume that the power switch on the client terminal 1002 of the user who has entered a contract with the provider that runs the service-providing system 1000 is turned on, or the user depresses an operation button of the input unit 1020. Then, an operation signal is generated. The input-processing unit 1021 converts the operation-input signal to an operation command. Upon receiving this operation command, the control unit 1023 starts the authentication request process.

When the client terminal 1002 starts the authentication request process. First, in Step SP1000, the control unit 1023 generates a connection request signal. The connection request signal contains the authentication-cession ID data and the like, which are temporarily stored in the authentication-information storage unit 1038. The connection request signal is transmitted to the portal server 1003, first through the communications control unit 1032 and then through the network interface 1033.

Note that the portal server 1003 issues authentication-cession ID data every time the client terminal 1002 is connected to the portal server 1003. That is, the authentication-cession ID data identifies the communication connection condition (i.e., cession) between the client terminal 1002 and the portal server 1003.

The authentication-cession ID data used for user authentication or the like is valid for a predetermined term, from the time the portal server 1003 issues it. (The validation term is, for example, about one minute.)

Therefore, the client terminal 1002 that has received the authentication-cession ID data from the portal server 1003 is considered to be disconnected from the portal server 1003 if it fails to transmit the ID data back to the portal server 1003 within the validation term.

Since the authentication-cession ID data is valid for a specific time only, the portal sever 1003 prevents any user who has entered a contract with the provider that runs the service-providing system 1000 from using any authentication-cession ID data issued in the past to identify himself or herself as an authenticated user.

The authentication-information storage unit 1038 temporarily stores the authentication-cession ID data. This ID data is data that the portal server 1003 issued when the client terminal 1002 was connected to the portal server 1003 to have its user authenticated.

In Step SP1001, the control unit 1050 of the portal server 1003 receives the connection request signal from the client terminal 1002 through the network interface 1053 and the communications control unit 1052. The control unit 1050 supplies the authentication-cession ID data and the like, which are contained in the connection request signal, to the authentication-process unit 1056.

Controlled by the control unit 1050, the authentication-process unit 1056 performs the process of authenticating the user on the basis of the authentication-cession ID data received as connection request signal from the client terminal 1002.

The authentication-process unit 1056 may not authenticate the user of the client terminal 1002 because the authentication-cession ID data is no longer valid. In this case, the control unit 1050 transmits authentication-error data indicating that the user is not authenticated, to the client terminal 1002, first through the communications control unit 1052 and then through the network interface 1053.

In Step SP1002, the control unit 1023 of the client terminal 1002 receives the authentication-error data from the portal server 1003, first through the network interface 1033 and then through the communications control unit 1032. In response to the authentication-error data, the control unit 1023 reads the user ID code, the user password, and the like, stored in the authentication-information storage unit 1038. Then, the control unit 1023 transmits the user ID code, the user password and the like to the portal server 1003 through the communications control unit 1032 and the network interface 1033.

In Step SP1003, the control unit 1050 of the portal server 1003 receives the user ID code, the user password and the like from the client terminal 1002, first through the network interface 1053 and then through the communications control unit 1052. The control unit 1050 supplies the user ID code, the user password and the like to the authentication-process unit 1056.

Controlled by the control unit 1050, the authentication-process unit 1056 performs the process of authenticating the user. That is, the unit 1050 determines whether the user ID code, the user password and the like, received from the client terminal 1002, are included in the client information registered in the client database unit 1054.

As the result, the authentication-process unit 1056 may determine that the user of the client terminal 1002 is authenticated. If this is the case, the control unit 1050 controls the authentication-process unit 1056, causing the unit 1056 to issue authentication-cession ID data that shows the condition of communication between the client terminal 1002 and the portal server 1003. The authentication-cession ID data is transmitted to the client terminal 1002. At the same time, the authentication-cession ID data is temporarily stored in the authentication-information storage unit 1057.

The control unit 1050 transmits the authentication-cession ID data and the like, issued by the authentication-process unit 1056, to the client terminal 1002, first through the communications control unit 1052 and then through the network interface 1053.

In Step SP1004, the control unit 1023 of the client terminal 1002 receives the authentication-cession ID data and the like, transmitted from the portal server 1003, first through the network interface 1033 and then through the communications control unit 1032. The control unit 1023 supplies the authentication-cession ID data and the like to the authentication-process unit 1037.

Controlled by the control unit 1023, the authentication-information storage unit 1038 temporarily stores the authentication-cession ID data and the like that have been received from the portal server 1003.

The control unit 1023 transmits a page-information acquisition request signal to the portal server 1003, first through the communications control unit 1032 and then through the network interface 1033. The page-information acquisition request signal demands that the portal server 1003 should give page information to the terminal 1002. The control unit 1023 transmits this signal, together with the authentication-cession ID data and the like that have been received from the portal server 1003 and temporarily stored in the authentication-information storage unit 1038.

In Step SP1005, the control unit 1050 of the portal server 1003 receives the page-information acquisition request signal, the authentication-cession ID data, and the like, transmitted from the client terminal 1002, first through the network interface 1053 and then through the communications control unit 1052. The control unit 1050 supplies the authentication-cession ID data and the like to the authentication-process unit 1056.

The authentication-process unit 1056 carries out the process of authenticating the user of the client terminal 1002, under the control of the control unit 1050. More precisely, the unit 1056 compares the authentication-cession ID data and the like, which have been transmitted from the client terminal 1002, with the authentication-cession ID data and the like, which have been issued to the client terminal 1002 in Step SP1003 and temporarily stored in the authentication-information storage unit 1057.

If the user of the client terminal 1002 is found to be an authenticated one in Step SP1006, the authentication-process unit 1056 determines that the request for page information made by the client terminal 1002 is justifiable. Then, the validation term of the authentication-cession ID data and the like issued to the client terminal 1002 is extended.

In Step SP1006, the control unit 1050 reads the page information requested for by the user, from the page-information storage unit 1055. The control unit 1050 then transmits the page information to the client terminal 1002, first through the communications control unit 1052 and then through the network interface 1053, together with the authentication-cession ID data and the like, the validation term of which has been extended from the authentication-process unit 1056.

In Step SP1007, the control unit 1023 of the client terminal 1002 receives the page information, the authentication-cession ID data, and the like, all transmitted from the portal server 1003, first through the network interface 1033 and then through the communications control unit 1032. The page information is supplied to the page-information generating unit 1036. The authentication-cession ID data and the like, the validation term of which has been extended, are supplied to the authentication-process unit 1037.

The page-information generating unit 1036 generates video data from the page information supplied from the control unit 1023. The video data represents a page that contains data items showing the links to the music-data distributing server 1004, physical-sales server 1005 and radio-data distributing server 1006. The generated video data is sent to the display control unit 1024.

The display control unit 1024 performs digital-to-analog conversion on the video data supplied from the page-information generating unit 1036. Thus, the unit 1024 generates an analog video signal. The analog video signal is supplied to the display unit 1025. The display unit 1025 displays the page information about the portal server 1003, which is represented by the analog video signal.

The authentication-process unit 1037 updates the authentication-cession ID data and the like, which are temporarily stored in Step S1004, to new authentication-cession ID data and the like whose validation term has been extended. More specifically, the unit 1037 receives the authentication-cession ID data and the like, whose validation term has been extended, from the portal server 1003, and writes them over the authentication-cession ID data and the like, whose validation term has not been extended, in the authentication-information storage unit 1038.

(3-7-2) Sequence of the User Authentication between the Client

Terminal 1002 and the Servers 1004 to 1006

Figure 22:
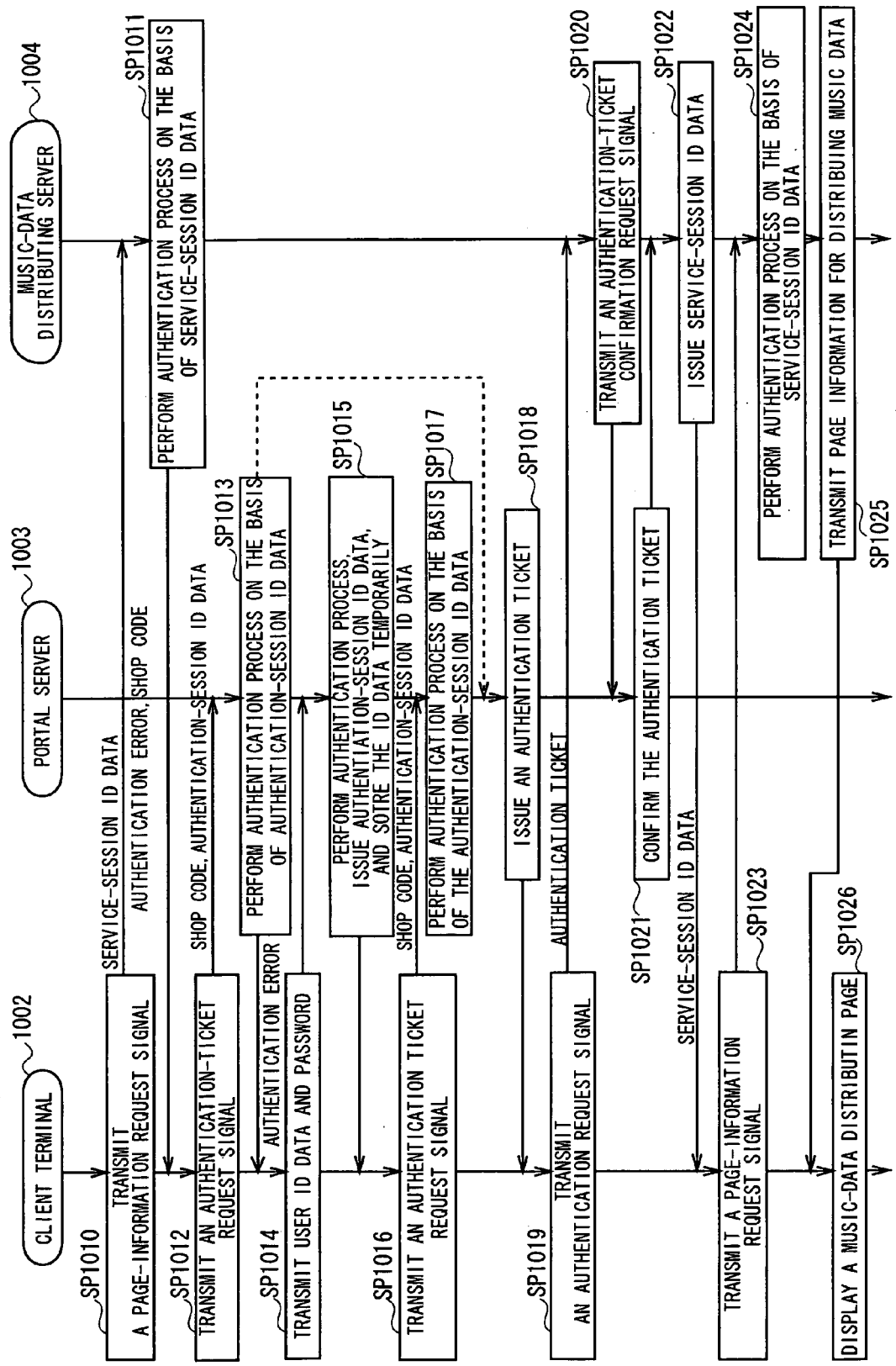
FIG. 22 is a sequence chart illustrating the sequence of authenticating the user, accomplished between the client terminal and the music-data distributing server.

The process of authenticating the user, which is achieved between the client terminal 1002, one the one hand, and the music-data distributing server 1004, physical-sales server 1005 and radio-data distributing server 1006, on the other hand, will be explained, with reference to the sequence chart of FIG. 22.

The user may be authenticated as illustrated in FIG. 8. That is, the client terminal 1002 may first acquire the page information from the portal server 1003 and then accesses the music-data distributing server 1004, physical-sales server 1005 and radio-data distributing server 1006 by using the link contained in the page information. (Hereinafter, the method of authenticating the user will be called "indirect-access authentication process.")

The user may be authenticated by another method. In this method, the client terminal 1002 uses URL information and the like, which are registered as book marks. Thus, the client terminal 1002 directly accesses the music-data distributing server 1004, physical-sales server 1005 and radio-data distributing server 1006, without acquiring the page information about the portal server 1003. (Hereinafter, this method of authenticating the user will be referred to as "direct-access authentication process").

In the indirect-access authentication process, the steps are performed in the same sequence, no matter whether the client terminal 1002 exchange data with the music-data distributing server 1004, physical-sales server 1005 or radio-data distributing server 1006.

In the direct-access authentication process, too, the steps are carried out in the same sequence, whether the client terminal 1002 exchange data with the music-data distributing server 1004, physical-sales server 1005 or radio-data distributing server 1006.

That is, the direct-access authentication process and the indirect-access authentication process are different only in the way in which the client terminal 1002 acquires the URL information it uses to access to the music-data distributing server 1004, physical-sales server 1005 or radio-data distributing server 1006. In both processes, the steps are performed in the same order.

Therefore, the direct-access authentication process and the indirect-access authentication process will be explained hereinafter as one method of authenticating the user. For simplification of description, it will be described how the music-data distributing server 1004 is accessed in order to authenticate the user of the client terminal 1002.

First, in Step SP1010, the control unit 1023 of the client terminal 1002 transmits the service-cession ID data to the music-data distributing server 1004 through the communications control unit 1032 and the network interface 1033, in accordance with the URL information contained as a link in the page information or the URL information registered as book mark. The service-cession ID data is transmitted to the server 1004, together with a page-information acquisition request signal. This request signal requests for the page information about the music data distribution. (If the client terminal 1002 must access the physical-sales server 1005, the request signal will be one that requests for the page information about the package media for sale. If the client terminal 1002 must access the radio-data distributing server 1006, the request signal will be one that requests for the page information about on-air list information.)

The service-cession ID data is identification data that the server (i.e., music-data distributing server 1004, physical-sales server 1005 or radio-data distributing server 1006) accessed by the client terminal 1002 issues every time it communicates with the client terminal 1002 to perform any process such as the authentication of the user. Namely, the service-cession ID data identifies the communication connection condition (i.e., cession) between the client terminal 1002 and the server (i.e., music-data distributing server 1004, physical-sales server 1005 or radio-data distributing server 1006).

Like the authentication-cession ID data described above, the service-cession ID data is valid for a predetermined term (e.g., about one minute), from the time the music-data distributing server 1004, physical-sales server 1005 or radio-data distributing server 1006 issues it. This measure is taken to accomplish reliable user authentication.

Thus, the client terminal 1002 will be considered to have been disconnected from the music-data distributing server 1004, physical-sales server 1005 or radio-data distributing server 1006 if it cannot give the service-cession ID data back to one of these servers within the validation term. In other words, the music-data distributing server 1004, physical-sales server 1005 or radio-data distributing server 1006, which has issued the service-cession ID data, will regard the client terminal 1002 as having been disconnected unless it receives the ID data returned from the terminal 1002 within that validation term.

Hence, the music-data distributing server 1004, physical-sales server 1005 and radio-data distributing server 1006 are prevented from being used by anyone who has not entered a contract with the provider that runs the service-providing system 1000 that offers service relating to music.

The authentication-information storage unit 1038 temporarily stores the service-cession ID data. Note that the service-cession ID data is the data that the music-data distributing server 1004, physical-sales server 1005 or radio-data distributing server 1006 issued when it was connected to the client terminal 1002 in the past for user authentication or the like.

In Step SP1011, the control unit 1070 of the music-data distributing server 1004 receives the page-information acquisition request signal, the service-cession ID data and the like that have been transmitted from the client terminal 1002, first through the network interface 1073 and then through the communications control unit 1072. The control unit 1070 supplies the service-cession ID data and the like to the authentication-process unit 1075.

Controlled by the control unit 1070, the authentication-process unit 1075 compares the service-cession ID data and the like transmitted from the client terminal 1002, with the service-cession ID data and the like temporarily stored in the authentication-information storage unit 1077. Thus, the unit 1075 carries out the process of authenticating the user.

The authentication-process unit 1075 may not authenticate the user of the client terminal 1002 as a legal one, because the service-cession ID data received from the client terminal 1002 is no longer valid. In this case, the unit 1075 determines that the requests for the page information for distributing music data transmitted from the client terminal 1002 is an illegal one.

If the authentication-process unit 1075 does not authenticate the user of the terminal 1002 as a legal one, the control unit 1070 transmits authentication-error data and a shop code to the client terminal 1002, first through the communications control unit 1072 and then through the network interface 1073. The authentication-error data indicates that the user has not been authenticated. The shop code identifies the music-data distributing server 1004.

In Step SP1012, the control unit 1023 of the client terminal 1002 receives the authentication-error data and the shop code, both transmitted from the music-data distributing server 1004, first through the network interface 1033 and then through the communications control unit 1032. From the authentication-error data, the control unit 1023 determines that the user has not been authenticated in the music-data distributing server 1004. The authentication-information storage unit 1038 temporarily stores the shop code received from the music-data distributing server 1004.

The portal server 1003 generates an authentication-ticket request signal, requesting for an authentication ticket that the client terminal 1002 will use to access the music-data distributing server 1004. The control unit 1023 transmits the authentication-ticket issuance request signal, along with the shop code of the server 1004, the authentication-cession ID data temporarily stored in the authentication-information storage unit 1038, and the like, to the portal server 1003, first through the communications control unit 1032 and then through the network interface 1033.

In Step SP1013, the control unit 1050 of the portal server 1003 receives the authentication-ticket issuance request signal, the shop code, the authentication-cession ID data, and the like, all transmitted from the client terminal 1002, through the network interface 1053 and the communications control unit 1052. The control unit 1050 supplies these data items to the authentication-process unit 1056.

Controlled by the control unit 1050, the authentication-process unit 1056 compares the authentication-cession ID data and the like, received from the client terminal 1002, with the authentication-cession ID data and the like, temporarily stored in the authentication-information storage unit 1057. Thus, the authentication-process unit 1056 carries out the process of authenticating the user.

The authentication-cession ID data transmitted from the client terminal 1002 may no longer be valid, the authentication-process unit 1056 cannot determine whether the user is a legal user of the client terminal 1002 or not. If this is the case, the authentication-process unit 1056 determines that the requests for issuing the authentication ticket from the client terminal 1002 is an illegal one.

The authentication-process unit 1056 may not authenticate the user of the client terminal 1002. In this case, the control unit 1050 generates authentication-error information indicating the user cannot be authenticated. The control unit 1050 transmits the authentication-error information to the client terminal 1002, first through the communications control unit 1052 and then through the network interface 1053.

The authentication-process unit 1056 may authenticate the user of the client terminal 1002. Then, it is determined that the authentication-cession ID data received from the client terminal 1002 remains valid. The user of the client terminal 1002 is authenticated as a legal one. The requests for issuing the authentication ticket transmitted from the client terminal 1002 is therefore considered to be illegal.

If the authentication-process unit 1056 authenticates the user of the client terminal 1002, the control unit 1050 goes to Step SP1018.

In Step SP1014, the control unit 1023 of the client terminal 1002 receives the authentication-error information from the portal server 1003, first through the network interface 1033 and then through the communications control unit 1032. Then, the control unit 1023 reads the user ID code, the user password and the like, which are stored in the authentication-information storage unit 1038. The user ID code, the user password and the like are transmitted to the portal server 1003 through the communications control unit 1032 and the network interface 1033.

In Step SP1015, the control unit 1050 of the portal server 1003 receives the user ID code, the user password and the like from the client terminal 1002, through the network interface 1053 and the communications control unit 1052. The control unit 1050 supplies the user ID code, the user password and the like to the authentication-process unit 1056.

Controlled by the control unit 1050, the authentication-process unit 1056 performs the process of authenticating the user. More precisely, the unit 1056 determines whether the user ID code, the user password and the like it has received from the client terminal 1002 are contained in the client information that is registered in the client database unit 1054.

The authentication-process unit 1056 may determine that the user of the client terminal 1002 is a legal one. In this case, the unit 1056 issues authentication-cession ID data and the like, under the control of the control unit 1050. The authentication-cession ID data identifies the communication connection condition between the client terminal 1002 and the portal server 1003. The authentication-cession ID data and the like, thus issued for the client terminal 1002, are temporarily stored in the authentication-information storage unit 1057.

The control unit 1050 then transmits the authentication-cession ID data and the like, which have been issued for the client terminal 1002, to the client terminal 1002 by the authentication-process unit 1056, first through the communications control unit 1052 and then through the network interface 1053.

In Step SP1016, the control unit 1023 of the client terminal 1002 receives the authentication-cession ID data and the like from the portal server 1003, first through the network interface 1033 and then through the communications control unit 1032. The authentication-process unit 1037 writes the authentication-cession ID data and the like into the authentication-information storage unit 1038. The unit 1038 temporarily stores the authentication-cession ID data and the like.

The control unit 1023 generates an authentication-ticket issuance request signal, requesting that the portal server 1003 should issue an authentication ticket again. The authentication-ticket issuance request signal is transmitted to the portal server 1003 through the communications control unit 1032 and the network interface 1033, together with the shop code, the authentication-cession ID data, and the like, all temporarily stored in the authentication-information storage unit 1038.

In the present embodiment, the shop code is temporarily stored in the authentication-information storage unit 1038 of the client terminal 1002. Nonetheless, the shop code can be transferred between the client terminal 1002 and the portal server 1003 to perform Steps SP1012 to SP1016. Thus, the shop code can be transmitted to the portal server 1003 in Step SP1016, without the necessity of temporarily storing the shop code in the authentication-information storage unit 1038 of the client terminal 1002.

In Step SP1017, the control unit 1050 of the portal server 1003 receives the authentication-ticket issuance request signal, the shop code, the authentication-cession ID data, and the like, from the client terminal 1002, first through the network interface 1053 and then through the communications control unit 1052. The control unit 1050 supplies them to the authentication-process unit 1056.

Controlled by the control unit 1050, the authentication-process unit 1056 performs the process of authenticating the user. To be more specific, the unit 1056 compares the authentication-cession ID data and the like it has just received from the client terminal 1002, with the authentication-cession ID data and the like that are temporarily stored in the authentication-information storage unit 1057.

The authentication-process unit 1056 may authenticate the user as a legal user of the client terminal 1002 because the authentication-cession ID data and the like, received from the client terminal 1002, are still valid. If this is the case, the unit 1056 determines that the request for issuing the authentication ticket transmitted from the client terminal 1002 is justifiable.

When the authentication-process unit 1056 authenticates the user as a legal user of the client terminal 1002, the control unit 1050 goes to the next step, Step SP1018.

In Step SP1018, controlled by the control unit 1050, the authentication-process unit 1056 issues an authentication ticket and the like in accordance with the shop code and authentication-ticket issuance request signal it has received from the client terminal 1002 in Step SP1017. The authentication ticket and the like enable the client terminal 1002 to access the music-data distributing server 1004 indicated by the shop code.

Controlled by the control unit 1050, the authentication-process unit 1056 writes the authentication ticket and the like into the authentication-information storage unit 1057, thus temporarily storing them in this storage unit 1057. At the same time, the unit 1056 extends the validation term of the authentication-cession ID data and the like that have been issued to the client terminal 1002.

The control unit 1050 transmits the authentication ticket and the like to the client terminal 1002, first through the communications control unit 1052 and then through the network interface 1052 together with the authentication-cession ID data and the like, whose validation term has been extended by the authentication-process unit 1056.

In Step SP1019, the control unit 1023 of the client terminal 1002 receives the authentication ticket, the authentication-cession ID data, and the like, from the portal server 1003, first through the network interface 1033 and then through the communications control unit 1032. The control unit 1023 supplies the authentication-cession ID data to the authentication-process unit 1037.

The control unit 1023 transmits the authentication ticket and the like it has received from the portal server 1003, together with an authentication request signal, to the music-data distributing server 1004, through the communications control unit 1032 and the network interface 1033.

Controlled by the control unit 1023, the authentication-process unit 1037 writes the authentication-cession ID data and the like which have been transmitted from the portal server 1003 and whose validation term has been extended, over the authentication-cession ID data and the like that are stored authentication-information storage unit 1038. In other words, the authentication-process unit 1037 updates, in the storage unit 1038, the authentication-cession ID data and the like temporarily stored in Step SP1016 to those the validation term of which has been extended.

In Step SP1020, the control unit 1070 of the music-data distributing server 1004 receives the authentication request signal, the authentication ticket, and the like, from the client terminal 1002, first through the network interface 1073 and then through the communications control unit 1072.

The control unit 1070 transmits the authentication ticket, and the like received from the client terminal 1002 to the portal server 1003 through the communication control unit 1072 and the network interface 1073, together with an authentication-ticket confirmation request signal requesting the confirmation of the authentication ticket.

In Step SP1021, the control unit 1050 of the portal server 1003 receives the authentication-ticket confirmation request signal, the authentication ticket and the like from the music-data distributing server 1004, first through the network interface 1053 and then through the communications control unit 1052. The control unit 1050 supplies the authentication-ticket confirmation request signal, the authentication ticket and the like to the authentication-process unit 1056.

Controlled by the control unit 1050, the authentication-process unit 1056 performs the process of confirming the authentication ticket transmitted from the music-data distributing server 1004, in response to the authentication-ticket confirmation request signal. More correctly, the unit 1056 compares the authentication ticket and the like it has received from the music-data distributing server 1004, with the authentication ticket and the like, which are stored in the authentication-information storage unit 1057.

The authentication-process unit 1056 may confirm that the authentication ticket and the like, which have been received from the music-data distributing server 1004, is a legal one. In this case, the control unit 1050 generates confirmation-result information indicating that the authentication ticket is a legal one. The confirmation-result information is transmitted to the music-data distributing server 1004, first through the communications control unit 1052 and then through the network interface 1053.

In Step SP1022, the control unit 1070 of the music-data distributing server 1004 receives the confirmation-result information from the portal server 1003, first through the network interface 1073 and then through the communications control unit 1072. The control unit 1070 supplies the confirmation-result information to the authentication-process unit 1075.

Controlled by the control unit 1070, the authentication-process unit 1075 issues a service-cession ID data and the like in response to the confirmation-result information. The service-cession ID data identifies the communication connection condition between the client terminal 1002 and the music-data distributing server 1004 as server-authentication result information. The authentication-process unit 1075 writes the service-cession ID data and the like into the authentication-information storage unit 1077, thus temporarily storing them in the authentication-information storage unit 1077.

Further, the control unit 1070 transmits the service-cession ID data and the like issued by the authentication-process unit 1075 to the client terminal 1002 through the communications control unit 1072 and the network interface 1073. Note that the service-cession ID data and the like have been issued for the client terminal 1002.

In Step SP1023, the control unit 1023 of the client terminal 1002 receives the service-cession ID data and the like from the music-data distributing server 1004, first through the network interface 1033 and then through the communications control unit 1032. The authentication-process unit 1037 writes the service-cession ID data and the like into the authentication-information storage unit 1038, temporarily storing them in the storage unit 1038.

The control unit 1023 then receives a page-information acquisition request signal from the music-data distributing server 1004. The page-information acquisition request signal requests for page information that will be used to have music-data distributed from the music-data distributing server 1004. The control unit 1023 transmits the page-information acquisition request signal to the music-data distributing server 1004 through the communication control unit 1032 and the network interface 1033, together with the service-cession ID data and the like which are temporarily stored in the authentication-information storage unit 1038.

In Step SP1024, the control unit 1070 of the music-data distributing server 1004 receives the page-information acquisition request signal, the service-cession ID data and the like from the client terminal 1002, first through the network interface 1073 and then through the communications control unit 1072. The control unit 1070 then supplies the service-cession ID data and the like to the authentication-process unit 1075.

Controlled by the control unit 1070, the authentication-process unit 1075 compares the service-cession ID data and the like received from the client terminal 2002 with the service-cession ID data and the like that have been issued for the client terminal 1002 in Step SP1022 and temporarily stored into the authentication-information storage unit 1077. Thus, the control unit 1070 performs the process of authenticating the user.

The authentication-process unit 1075 may authenticate the user as a legal user of the client terminal 1002 because the service-cession ID data and the like received from the client terminal 1002 are still valid. If this is the case, the unit 1075 determines that the request for acquiring the page information that has been transmitted from the client terminal 1002 and will be used to distribute music data is justifiable.

When the authentication-process unit 1075 authenticates the user of the client terminal 1002 is a legal one, the control unit 1070 goes to the next step, Step SP1025.

In Step SP1025, the control unit 1070 reads the page information from the page-information storage unit 1076, so that music data may be distributed to the user. Further, the control unit 1070 causes the authentication-process unit 1075 to extend the validation term of the service-cession ID data and the like issued to the client terminal 1002.

Then, the control unit 1070 transmits the page information for use in distributing music data from the page-information storage unit 1076, to the client terminal 1002 through the communications control unit 1072 and the network interface 1073. The page information is transmitted to the client terminal 1002, together with the service-cession ID data and the like whose validation term has been extended by the authentication-process unit 1075.

In Step SP1026, the control unit 1023 of the client terminal 1002 receives, through the network interface 1033 and communications control unit 1032, the page information for use in distributing music data transmitted from the music-data distributing server 1004 and also the service-cession ID data and the like whose validation term has been extended. The control unit 1023 supplies the page information for use in distributing music data, to the page-information generating unit 1036. At the same time, the control unit 1023 transmits the service-cession ID data and the like to the authentication-process unit 1037. Note that the service-cession ID data and the like have been received from the music-data distributing server 1004.

Controlled by the control unit 1023, the authentication-process unit 1037 writes the service-cession ID data and the like which have been transmitted from the music-data distributing server 1004 and whose validation term has been extended, over the service-cession ID data and the like that are stored in the authentication-information storage unit 1038. In other words, the authentication-process unit 1037 updates, in the storage unit 1038, the service-cession ID data and the like temporarily stored in above-described Step SP1023 to those the validation term of which has been extended.

The page-information generating unit 1036 generates video data from the page information for use in distributing music data. The video data thus generated is supplied to the display control unit 1024.

The display control unit 1024 performs digital-to-analog conversion on the video data supplied from the page-information generating unit 1036, generating an analog video signal. The analog video signal is supplied to the display unit 1025. The display unit 1025 displays a music-data distributing page that is represented by the analog video signal.

Having the configuration described above, the service-providing system 1000 that offers service relating to music, according to the second embodiment, can attain the same advantages as the first embodiment.

(4) Other Embodiments

The various processes are performed in the first and second embodiments as a computer executes the programs that describe these processes.

The programs describing the processes performed in the first and second embodiments may be recorded in a computer-readable recording medium. The computer-readable recording medium may be a magnetic recording apparatus, an optical disk, a magneto-optical recording medium, a semiconductor memory, and the like. The magnetic recording apparatus may be a hard disk drive (HDD), a flexible disc (FD), magnetic tape, and the like. The optical disc may be a DVD, a DVD-RAM, a CD-ROM (Read Only Memory), a CD-R (Recordable)/RW (RewriFtable), and the like. The magneto-optical recording medium may be an MO (Magneto-Optical disc).

To execute the programs, the computer reads the program recorded in a portable recording medium or receives the program from a server computer. The computer then stores the programs into the storage apparatus incorporated in it. The computer reads the programs from the storage apparatus and executes them. The computer may execute the programs it has read directly from the portable recording medium. In addition, the computer can perform the processes described in any programs that have been transferred to it from the server computer.

In the first and second embodiments described above, what the terminal apparatus 10 and the client terminal 1002 can receive is information broadcast from radio stations. Nonetheless, the terminal apparatus 10 and the client terminal 1002 may receive Internet-radio-broadcast or satellite-radio-broadcast programs, acquiring the information about these programs and also radio-broadcast information. Alternatively, they may receive television programs broadcast from the television stations, acquiring the information about the television programs from a server provided on the network.

Further, in the first and second embodiments described above, the hardware circuit blocks, function-circuit blocks and program modules are incorporated in the terminal apparatus 10 and client terminal 1002. Nevertheless, they may be incorporated into terminals of other types, such as mobile telephones, personal computers and the like. Then, any other terminal having such blocks and modules can perform the same processes as the terminal apparatus 10 and client terminal 1002 do.

Moreover, in the first and second embodiments described above, the portable server 103 that functions as information-processing apparatus comprises the communications control unit 1052 that functions as receiving/transmitting means, the client database unit 1054 that functions as storage means, and the control unit 1050 that functions as a deleting means. The present invention is not limited to these embodiments. The information-processing apparatus may comprise receiving means composed of various circuits, a storage means, a deleting means and a transmitting means.

INDUSTRIAL APPLICABILITY

The present invention can be used not only in a network system that provides service relating to music, but also in various network systems that provides, for example, video contents.

EXPLANATION OF REFERENCE NUMERALS

1 . . . INFORMATION-PROCESSING APPARATUS, 2 . . . RECEIVING MEANS, 3 . . . STORAGE MEANS, 4 . . . RECORDING MEDIUM, 5 . . . DELETING MEANS, 6 . . . TRANSMITTING MEANS, 7 . . . EXTERNAL APPARATUS, 10, 50*a*-50*c*, 51*a*, 51*b*. . . TERMINAL APPARATUS, 11, 35*a*. . . CPU, 12 . . . BUS, 13 . . . ROM, 14 . . . INPUT-

PROCESSING UNIT, 15 ... OPERATION INPUT UNIT, 16 ... DISPLAY-PROCESSING UNIT, 17 ... DISPLAY DEVICE, 19a, 19b... MEDIA DRIVE, 22 ... COMMUNICATIONS PROCESS UNIT, 23 ... NETWORK INTERFACE, 24 ... AUDIO DATA PROCESSING UNIT, 25 ... SPEAKER, 28 ... INFRARED-RAY COMMUNICATIONS UNIT, 30 ... NETWORK, 31 ... CD-TITLE INFORMATION SERVER, 32 ... BROADCAST-STATION SERVER, 33 ... MUSIC DISTRIBUTING SERVER, 34 ... CD-SHOP SERVER, 35 ... INTEGRATED SERVICE SERVER, 40 ... REMOTE CONTROLLER, 41a-41d... DIRECTION KEYS, 43a-43c... FUNCTION-SELECTING KEYS, 44 ... TOOL KEY, 45 ... RETURN KEY, 1000 ... MUSIC-RELATED-SERVICE PROVIDING SYSTEM, 1002 ... CLIENT TERMINAL, 1003 .... PORTAL SERVER, 1004 ... MUSIC-DATA DISTRIBUTING SERVER, 1005 ... PHYSICAL-SALES SERVER, 1006 ... RADIO-DATA DISTRIBUTING SERVER, 1023 ... CONTROL UNIT, 1029 ... STORAGE MEDIUM, 1032 ... COMMUNICATIONS CONTROL UNIT, 1037 ... AUTHENTICATION PROCESSING UNIT, 1038 ... AUTHENTICATION-INFORMATION STORAGE UNIT

The invention claimed is:

1. An information-processing apparatus, comprising:
receiving means for receiving, in a ticket request, service ID data designating a service to be provided, together with user ID data and apparatus ID data, from an external apparatus, and for receiving a cancellation request including the user ID data and the apparatus ID data from the external apparatus;
storage means for storing the user ID data and the service ID data, in an association with the apparatus ID data, which identifies the external apparatus and which has been registered;
deleting means for deleting, from the storage means, the apparatus ID data after deleting, from the storage means, the service ID data, when the receiving means receives, from the external apparatus, the cancellation request requesting a deletion of the apparatus ID data, and for producing a result of an authentication based on the user ID data and the apparatus ID data upon a reception of the ticket request; and
transmitting means for transmitting a ticket to the external apparatus, in response to the reception of the ticket request, based on the result of the authentication based on the user ID data and the apparatus ID data, for transmitting a request corresponding to the service ID data to a different external apparatus after the service ID data is deleted from the storage means and before the apparatus ID data is deleted from the storage means, and for transmitting, to the external apparatus, deletion-complete information indicating that the deleting means has finished deleting the apparatus ID data upon the deletion.

2. The information-processing apparatus according to claim 1, wherein the external apparatus identified by the apparatus ID data stored in the storage means, in association with the service ID data, is requested to provide the service.

3. The information processing apparatus according to claim 1, wherein the ticket includes time data representing a time of the authentication.

4. The information-processing apparatus according to claim 3, wherein the deleting means compares the ticket with a ticket received by the receiving means, and the deleting means generates authentication-error information when the ticket received by the receiving means is not received within a predetermined term from the time of the authentication.

5. The information processing apparatus according to claim 3, wherein the deleting means confirms, based on the time data, an authenticity of the ticket, upon a reception of the ticket by the receiving means.

6. An information-processing system, comprising: an information-processing apparatus having,
receiving means for receiving, in a ticket request from an external apparatus, service ID data designating a service to be provided, together with user ID data and apparatus ID data identifying the external apparatus, and for receiving a cancellation request including the user ID data and the apparatus ID data from the external apparatus,
storage means for storing the user ID data, the apparatus ID data, and the service ID data, in an association with one another,
authentication means for performing an authenticating process in accordance with the user ID data and the apparatus ID data to produce an authentication result upon a reception of the ticket request,
deleting means for deleting, from the storage means, the apparatus ID data after deleting, from the storage means, the service ID data, when the receiving means receives, from the external apparatus, the cancellation request requesting a deletion of the apparatus ID data, and
transmitting means for transmitting a ticket to the external apparatus, in response to the reception of the ticket request, based on the authentication result in accordance with the user ID data and the apparatus ID data, for transmitting a request corresponding to the service ID data to a different external apparatus after the service ID data is deleted from the storage means and before the apparatus ID data is deleted from the storage means, and for transmitting deletion-complete information indicating that the deleting means has finished deleting the apparatus ID data upon the deletion,
the external apparatus having,
data-transmitting means for transmitting, in the ticket request, the user ID data, the apparatus ID data and the service ID data to the information-processing apparatus,
ID data storage means for storing the apparatus ID data,
ID data deleting means for deleting the apparatus ID data stored in the ID data storage means,
deletion-request transmitting means for transmitting the cancellation request requesting the deletion, and
completion-information receiving means for receiving the deletion-complete information.

7. The information-processing system according to claim 6, wherein the authentication means issues an authentication session ID that identifies a session with the external apparatus, the transmitting means transmits the authentication session ID to the external apparatus, the external apparatus transmits the service ID data, together with the authentication session ID received from the information-processing apparatus, the information-processing apparatus verifies the authentication session ID received, and issues the ticket corresponding to the service ID data received, and the data-transmitting means transmits a service-requesting signal to a server which provides the service, together with the ticket received, the service-requesting signal requesting that the server should provide the service.

8. A communication method for use in an information-processing apparatus, the communication method comprising:
receiving, in a ticket request from an external apparatus, service ID data designating a service to be provided, together with user ID data and apparatus ID data identifying the external apparatus;

storing, in the information-processing apparatus, the user ID data, the apparatus ID data, and the service ID data, in an association with one another;

authenticating, upon the receiving, the user ID data and the apparatus ID data to produce an authentication result;

transmitting a ticket to the external apparatus, in response to the receiving, based on the authentication result based on the user ID data and the apparatus ID data;

receiving a cancellation request including the user ID data and the apparatus ID data from the external apparatus;

deleting, from the information-processing apparatus, with a processor of the information-processing apparatus, the apparatus ID data after deleting, from the information-processing apparatus, the service ID data, upon the receiving the cancellation request requesting a deletion of the apparatus ID data;

transmitting a request corresponding to the service ID data to a different external apparatus after the service ID data is deleted from the information-processing apparatus and before the apparatus ID data is deleted from the information-processing apparatus; and transmitting, to the external apparatus, upon the deleting, deletion-complete information indicating that the apparatus ID data has been deleted.

9. A computer-readable non-transitory medium including a communication program, wherein the communication program, when executed by a computer, causes the computer to perform a method comprising:

receiving, in a ticket request from an external apparatus, service ID data designating a service to be provided, together with user ID data and apparatus ID data identifying the external apparatus;

storing, in the computer, the user ID data, the apparatus ID data, and the service ID data, in an association with one another;

authenticating, upon the receiving, the user ID data and the apparatus ID data to produce an authentication result;

transmitting a ticket to the external apparatus, in response to the receiving, based on the authentication result based on the user ID data and the apparatus ID data;

receiving a cancellation request including the user ID data and the apparatus ID data from the external apparatus;

deleting, from the computer, the apparatus ID data after deleting, from the computer, the service ID data, upon the receiving the cancellation request requesting a deletion of the apparatus ID data;

transmitting a request corresponding to the service ID data to a different external apparatus after the service ID data is deleted from the computer and before the apparatus ID data is deleted from the computer; and transmitting, to the external apparatus, upon the deleting, deletion-complete information indicating that the apparatus ID data has been deleted.

10. An information-processing apparatus, comprising:

an interface configured to receive, in a ticket request, service ID data designating a service to be provided, together with user ID data and apparatus ID data, from an external apparatus, and to receive a cancellation request including the user ID data and the apparatus ID data from the external apparatus;

a memory configured to store the user ID data and the service ID data, in an association with the apparatus ID data, which identifies the external apparatus and which has been registered;

a processor configured to produce a result of an authentication based on the user ID data and the apparatus ID data upon a reception of the ticket request, and to delete, from the memory, the apparatus ID data after deleting, from the memory, the service ID data, when the interface receives, from the external apparatus, the cancellation request requesting a deletion of the apparatus ID data, wherein the interface is configured to transmit a ticket to the external apparatus, in response to the reception of the ticket request, based on the result of the authentication based on the user ID data and the apparatus ID data, to transmit a request corresponding to the service ID data to a different external apparatus after the service ID data is deleted from the memory and before the apparatus ID data is deleted from the memory, and to transmit, to the external apparatus, upon the deletion, deletion-complete information indicating that the processor has finished deleting the apparatus ID data.

* * * * *